(12) United States Patent
Harvey et al.

(10) Patent No.: US 12,505,077 B2
(45) Date of Patent: *Dec. 23, 2025

(54) METHODS AND SYSTEMS FOR CONSTRUCT IDENTIFICATION AND ANALYSIS

(71) Applicant: Dronebase, Inc., Los Angeles, CA (US)

(72) Inventors: Alexander Harvey, West Chester, PA (US); Ronnie E. Cardwell, II, Green Bay, WI (US); Teague Maxfield, Green Bay, WI (US); Robert McNamara, Wyomissing, PA (US); James Colbey Ryan, Oxford, PA (US)

(73) Assignee: Dronebase, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,914

(22) Filed: Aug. 30, 2024

(65) Prior Publication Data

US 2025/0130979 A1 Apr. 24, 2025

Related U.S. Application Data

(63) Continuation of application No. 17/335,995, filed on Jun. 1, 2021, now Pat. No. 12,117,974.

(60) Provisional application No. 63/032,482, filed on May 29, 2020.

(51) Int. Cl.
*G06F 16/00* (2019.01)
*G01C 21/00* (2006.01)
*G06F 9/451* (2018.01)
*G06F 16/21* (2019.01)
*G06Q 50/06* (2012.01)

(52) U.S. Cl.
CPC ........ *G06F 16/211* (2019.01); *G01C 21/3807* (2020.08); *G01C 21/3837* (2020.08); *G06F 9/451* (2018.02); *G06Q 50/06* (2013.01)

(58) Field of Classification Search
None
See application file for complete search history.

(56) References Cited

U.S. PATENT DOCUMENTS

| | | | |
|---|---|---|---|
| 7,327,349 B2 | 2/2008 | Robbins et al. | |
| 7,616,329 B2 | 11/2009 | Villar et al. | |
| 7,965,312 B2 | 6/2011 | Chung et al. | |
| 8,060,270 B2 | 11/2011 | Vian et al. | |
| 8,319,665 B2 | 11/2012 | Weinmann et al. | |
| 8,595,642 B1 * | 11/2013 | Lagassey | G10L 15/22 715/779 |
| 8,744,133 B1 | 6/2014 | Troy et al. | |
| 8,880,241 B2 | 11/2014 | Mohamadi | |
| 8,907,886 B2 | 12/2014 | Robbins et al. | |

(Continued)

*Primary Examiner* — Jean M Corrielus
(74) *Attorney, Agent, or Firm* — Ballard Spahr LLP

(57) ABSTRACT

One or more aerial images of a construct (e.g., a utility construct, a utility asset, a power pole, a telephone pole, etc.) may be used to determine a location of the construct. The images may be used to identify adverse conditions affecting the construct such as wood rot, arc damage, flashing, tracking, floating conductors, loose tie-wires, loose hardware, and/or the like. The images may be used to prioritize actions to address the adverse conditions and identify and/or verify the location of the construct. aggregating the inspection data.

24 Claims, 22 Drawing Sheets

(56) References Cited

U.S. PATENT DOCUMENTS

| | | |
|---|---|---|
| 9,002,719 B2 | 4/2015 | Tofte |
| 9,014,415 B2 | 4/2015 | Chen et al. |
| 9,028,312 B1 | 5/2015 | Wei et al. |
| 9,037,314 B2 | 5/2015 | Waite et al. |
| 9,087,451 B1 | 7/2015 | Jarrell |
| 9,129,355 B1 | 9/2015 | Harvey et al. |
| 9,162,753 B1 | 10/2015 | Panto et al. |
| 9,330,449 B2 | 5/2016 | Newman |
| 9,412,279 B2 | 8/2016 | Kantor et al. |
| 9,421,869 B1 | 8/2016 | Ananthanarayanan et al. |
| 9,466,139 B2 | 10/2016 | Chen |
| 9,505,494 B1 | 11/2016 | Marlow et al. |
| 9,508,264 B1 | 11/2016 | Chan et al. |
| 9,513,635 B1 | 12/2016 | Bethke et al. |
| 9,536,149 B1 | 1/2017 | Cesarano |
| 9,561,870 B2 | 2/2017 | Zhou et al. |
| 9,571,796 B2 | 2/2017 | Mian et al. |
| 9,586,138 B2 | 3/2017 | Wei et al. |
| 9,609,288 B1 | 3/2017 | Richman et al. |
| 9,639,960 B1 | 5/2017 | Loveland et al. |
| 9,643,722 B1 | 5/2017 | Myslinski |
| 9,652,904 B2 | 5/2017 | Shi et al. |
| 9,678,507 B1 | 6/2017 | Douglas et al. |
| 9,789,976 B2 | 10/2017 | Zhou et al. |
| 9,805,261 B1 | 10/2017 | Loveland et al. |
| 9,823,664 B2 | 11/2017 | Krogh et al. |
| 9,905,060 B2 | 2/2018 | Shi et al. |
| 9,910,102 B2 | 3/2018 | Stoupis et al. |
| 9,922,412 B1 | 3/2018 | Freeman et al. |
| 10,032,267 B2 | 7/2018 | Strebel et al. |
| 10,038,492 B2 | 7/2018 | Gong et al. |
| 10,040,463 B2 | 8/2018 | Singh |
| 10,104,344 B2 | 10/2018 | Howard |
| 10,217,207 B2 | 2/2019 | Marra et al. |
| 10,275,140 B1* | 4/2019 | Miller ................ G06F 3/04817 |
| 10,295,659 B2 | 5/2019 | Wang et al. |
| 10,371,802 B2 | 8/2019 | Liu et al. |
| 10,375,383 B2 | 8/2019 | Jiang et al. |
| 10,377,485 B2 | 8/2019 | Claybrough |
| 10,475,208 B1 | 11/2019 | Morrison et al. |
| 10,481,608 B2 | 11/2019 | Loosararian et al. |
| 10,482,418 B2 | 11/2019 | Burch, V et al. |
| 10,489,976 B2 | 11/2019 | Jin et al. |
| 10,509,417 B2 | 12/2019 | van Cruyningen |
| 10,511,676 B2 | 12/2019 | Howe et al. |
| 10,520,387 B2 | 12/2019 | Wang et al. |
| 10,520,448 B2 | 12/2019 | Ziltz et al. |
| 10,529,029 B2 | 1/2020 | Okazaki |
| 10,539,663 B2 | 1/2020 | Liu et al. |
| 10,545,391 B2 | 1/2020 | Yan |
| 10,580,230 B2 | 3/2020 | Shi et al. |
| 10,584,683 B2 | 3/2020 | Lysgaard et al. |
| 10,600,194 B2 | 3/2020 | Chang et al. |
| 10,601,496 B2 | 3/2020 | Gong et al. |
| 10,607,107 B2 | 3/2020 | Barzelay et al. |
| 10,641,875 B2 | 5/2020 | Liu et al. |
| 10,649,449 B2* | 5/2020 | Bell ................ G05B 23/024 |
| 10,870,351 B2 | 12/2020 | Viswanathan |
| 10,951,862 B2 | 3/2021 | Golan et al. |
| 11,462,004 B2 | 10/2022 | Iwamoto |
| 2005/0195154 A1 | 9/2005 | Robbins et al. |
| 2009/0128483 A1 | 5/2009 | Robbins et al. |
| 2010/0088032 A1* | 4/2010 | Nielsen ................ G01C 15/06 |
| | | 702/5 |
| 2010/0189887 A1 | 7/2010 | Nielsen et al. |
| 2011/0193966 A1* | 8/2011 | Golan ................ H04N 7/181 |
| | | 348/E7.085 |
| 2012/0036140 A1* | 2/2012 | Nielsen ................ G06Q 10/06 |
| | | 707/754 |
| 2013/0169681 A1* | 7/2013 | Rasane ................ G06T 19/003 |
| | | 345/633 |
| 2014/0244695 A1* | 8/2014 | Battcher ................ G06F 16/29 |
| | | 707/807 |
| 2014/0245204 A1 | 8/2014 | Battcher et al. |
| 2014/0280277 A1* | 9/2014 | Tucker ................ G06F 16/2365 |
| | | 707/758 |
| 2015/0221079 A1 | 8/2015 | Schultz et al. |
| 2015/0321094 A1 | 11/2015 | Wei et al. |
| 2016/0019419 A1* | 1/2016 | Chen ................ G01C 21/3807 |
| | | 382/113 |
| 2016/0093124 A1 | 3/2016 | Shi et al. |
| 2016/0155250 A1* | 6/2016 | Chen ................ G01C 21/3815 |
| | | 345/440 |
| 2016/0189004 A1* | 6/2016 | Anastassov ............ G06F 18/24 |
| | | 382/113 |
| 2016/0189367 A1 | 6/2016 | Schultz et al. |
| 2016/0210790 A1 | 7/2016 | Rasane et al. |
| 2016/0229556 A1 | 8/2016 | Zhou et al. |
| 2017/0012697 A1 | 1/2017 | Gong et al. |
| 2017/0048518 A1 | 2/2017 | Jiang et al. |
| 2017/0106998 A1 | 4/2017 | Zhou et al. |
| 2017/0199042 A1* | 7/2017 | Arya ................ G01C 21/3807 |
| 2017/0221282 A1 | 8/2017 | Shi et al. |
| 2017/0234757 A1 | 8/2017 | Wang et al. |
| 2018/0060655 A1 | 3/2018 | Anastassov et al. |
| 2018/0067631 A1 | 3/2018 | Thiercelin et al. |
| 2018/0144419 A1* | 5/2018 | Mefford ............ G06Q 30/0645 |
| 2018/0149138 A1 | 5/2018 | Thiercelin et al. |
| 2018/0156897 A1 | 6/2018 | Xie et al. |
| 2018/0158259 A1 | 6/2018 | Shi et al. |
| 2018/0189749 A1 | 7/2018 | Takamori et al. |
| 2018/0208309 A1 | 7/2018 | Wang |
| 2018/0284229 A1 | 10/2018 | Liu et al. |
| 2018/0284579 A1 | 10/2018 | Yan |
| 2018/0292328 A1 | 10/2018 | Karube |
| 2018/0299387 A1 | 10/2018 | Nonaka |
| 2018/0300865 A1 | 10/2018 | Weiss et al. |
| 2018/0300871 A1 | 10/2018 | Wu et al. |
| 2018/0313941 A1 | 11/2018 | Wang et al. |
| 2018/0323862 A1 | 11/2018 | Gong et al. |
| 2018/0362159 A1 | 12/2018 | Tang et al. |
| 2018/0375352 A1 | 12/2018 | Zheng et al. |
| 2019/0025413 A1 | 1/2019 | Liu et al. |
| 2019/0054937 A1 | 2/2019 | Graetz et al. |
| 2019/0064329 A1 | 2/2019 | Liu et al. |
| 2019/0066283 A1 | 2/2019 | Gros et al. |
| 2019/0080446 A1 | 3/2019 | Kuzmin et al. |
| 2019/0084675 A1 | 3/2019 | Qu et al. |
| 2019/0106210 A1 | 4/2019 | Qu |
| 2019/0128772 A1 | 5/2019 | Heinrich et al. |
| 2019/0135450 A1 | 5/2019 | Zhou et al. |
| 2019/0137985 A1 | 5/2019 | Cella et al. |
| 2019/0144114 A1 | 5/2019 | Chen et al. |
| 2019/0156473 A1 | 5/2019 | Lau et al. |
| 2019/0158859 A1 | 5/2019 | Zhang et al. |
| 2019/0179346 A1 | 6/2019 | Sasao et al. |
| 2019/0187711 A1 | 6/2019 | Xie et al. |
| 2019/0221128 A1 | 7/2019 | Guo et al. |
| 2019/0257923 A1 | 8/2019 | Xie et al. |
| 2019/0265705 A1 | 8/2019 | Zhang et al. |
| 2019/0302241 A1 | 10/2019 | Liu et al. |
| 2019/0302247 A1 | 10/2019 | Wang et al. |
| 2019/0324127 A1 | 10/2019 | Liu et al. |
| 2019/0329806 A1 | 10/2019 | Anderson et al. |
| 2019/0332105 A1 | 10/2019 | Sant et al. |
| 2019/0337618 A1 | 11/2019 | Zhou et al. |
| 2019/0354115 A1 | 11/2019 | Zhang |
| 2019/0373173 A1 | 12/2019 | Wang et al. |
| 2019/0382133 A1 | 12/2019 | Zhang |
| 2019/0383918 A1 | 12/2019 | Wang et al. |
| 2020/0004272 A1 | 1/2020 | Pilskalns |
| 2020/0033479 A1 | 1/2020 | Schultz et al. |
| 2020/0043184 A1 | 2/2020 | Zhang |
| 2020/0051443 A1 | 2/2020 | Zhao et al. |
| 2020/0052389 A1 | 2/2020 | Liu et al. |
| 2020/0052623 A1 | 2/2020 | Zhou et al. |
| 2020/0056501 A1 | 2/2020 | Eastment |
| 2020/0057160 A1 | 2/2020 | Li et al. |
| 2020/0066168 A1 | 2/2020 | Thiercelin et al. |
| 2020/0092110 A1 | 3/2020 | Zhang et al. |
| 2020/0098103 A1 | 3/2020 | Chen et al. |
| 2020/0117881 A1 | 4/2020 | Wang et al. |
| 2020/0132822 A1 | 4/2020 | Pimentel et al. |

(56) References Cited

U.S. PATENT DOCUMENTS

| | | |
|---|---|---|
| 2020/0134318 A1 | 4/2020 | Li et al. |
| 2020/0141755 A1 | 5/2020 | Su et al. |
| 2020/0142039 A1 | 5/2020 | Liu et al. |
| 2020/0143164 A1 | 5/2020 | Schultz et al. |
| 2020/0143545 A1 | 5/2020 | Weng et al. |
| 2020/0150232 A1 | 5/2020 | Liu et al. |
| 2020/0151867 A1 | 5/2020 | Pyznar |
| 2020/0156676 A1 | 5/2020 | Chung et al. |
| 2020/0167510 A1 | 5/2020 | Buggenthin et al. |

\* cited by examiner

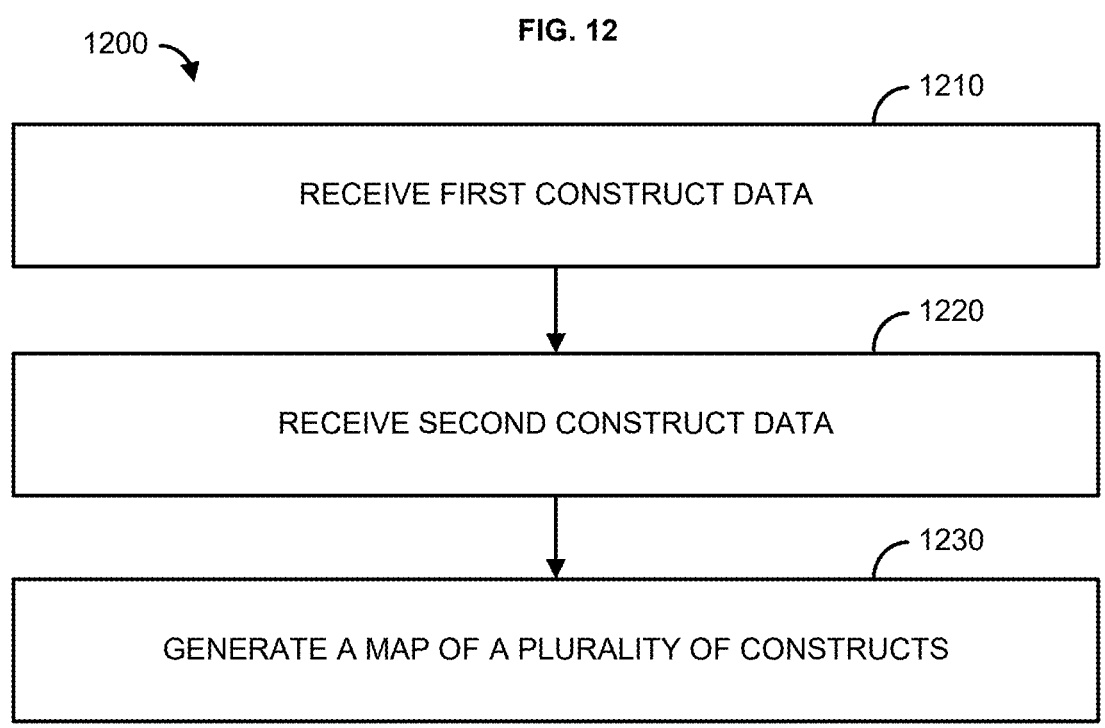

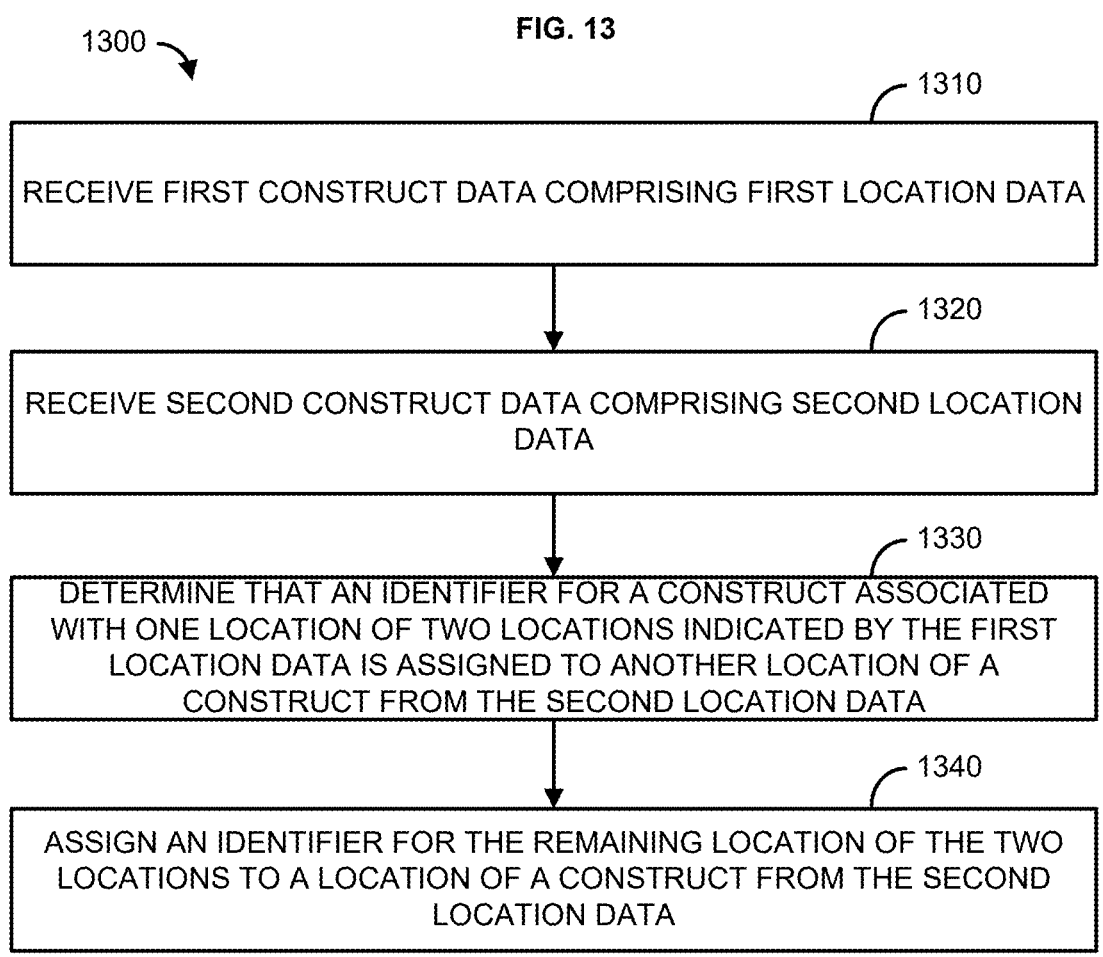

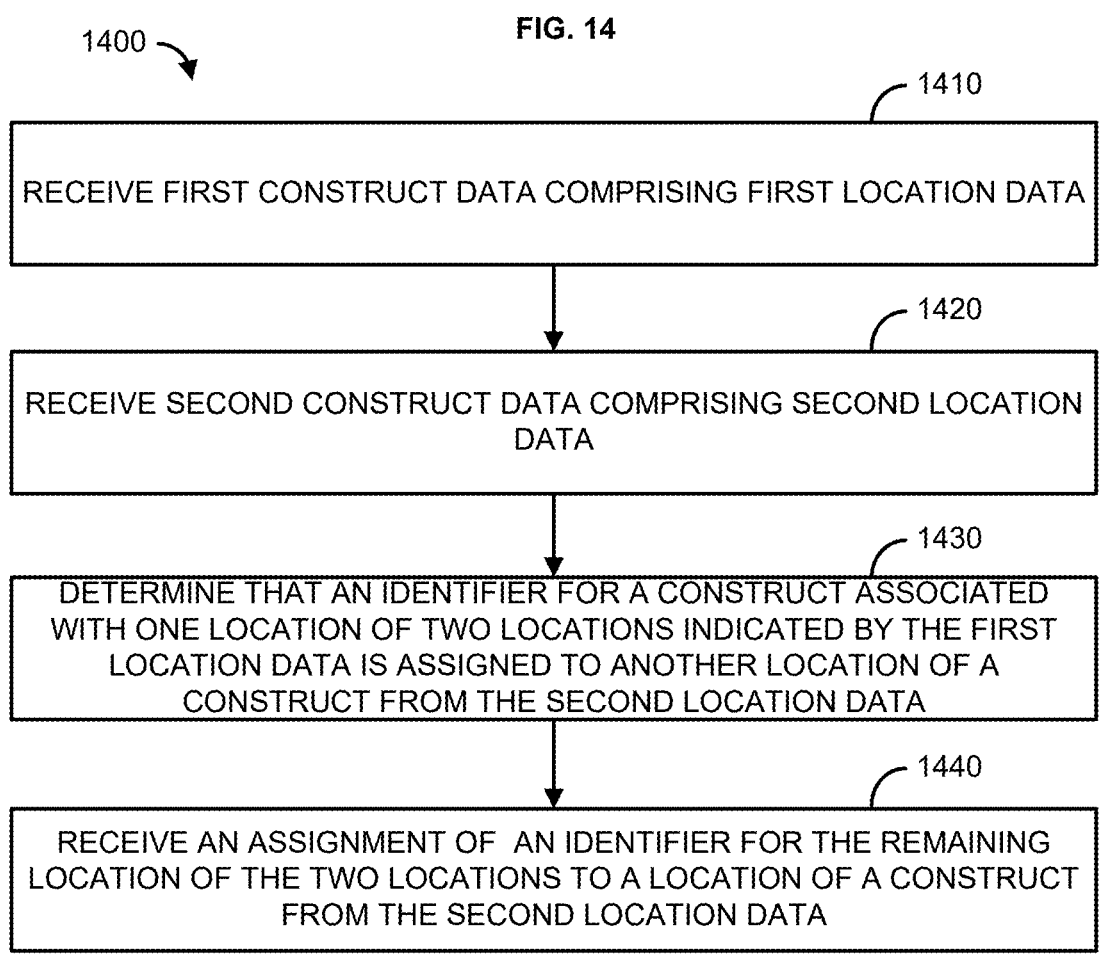

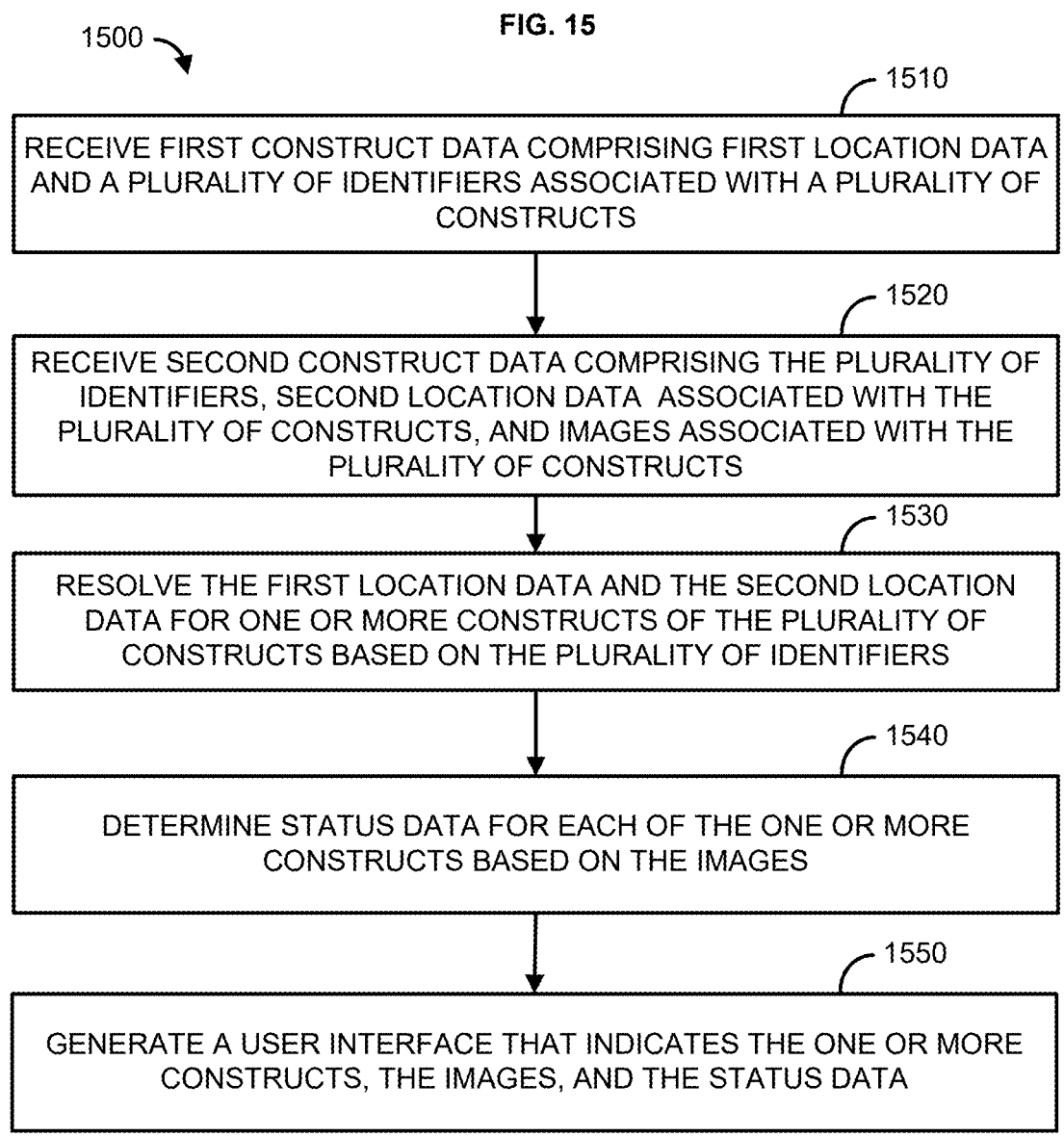

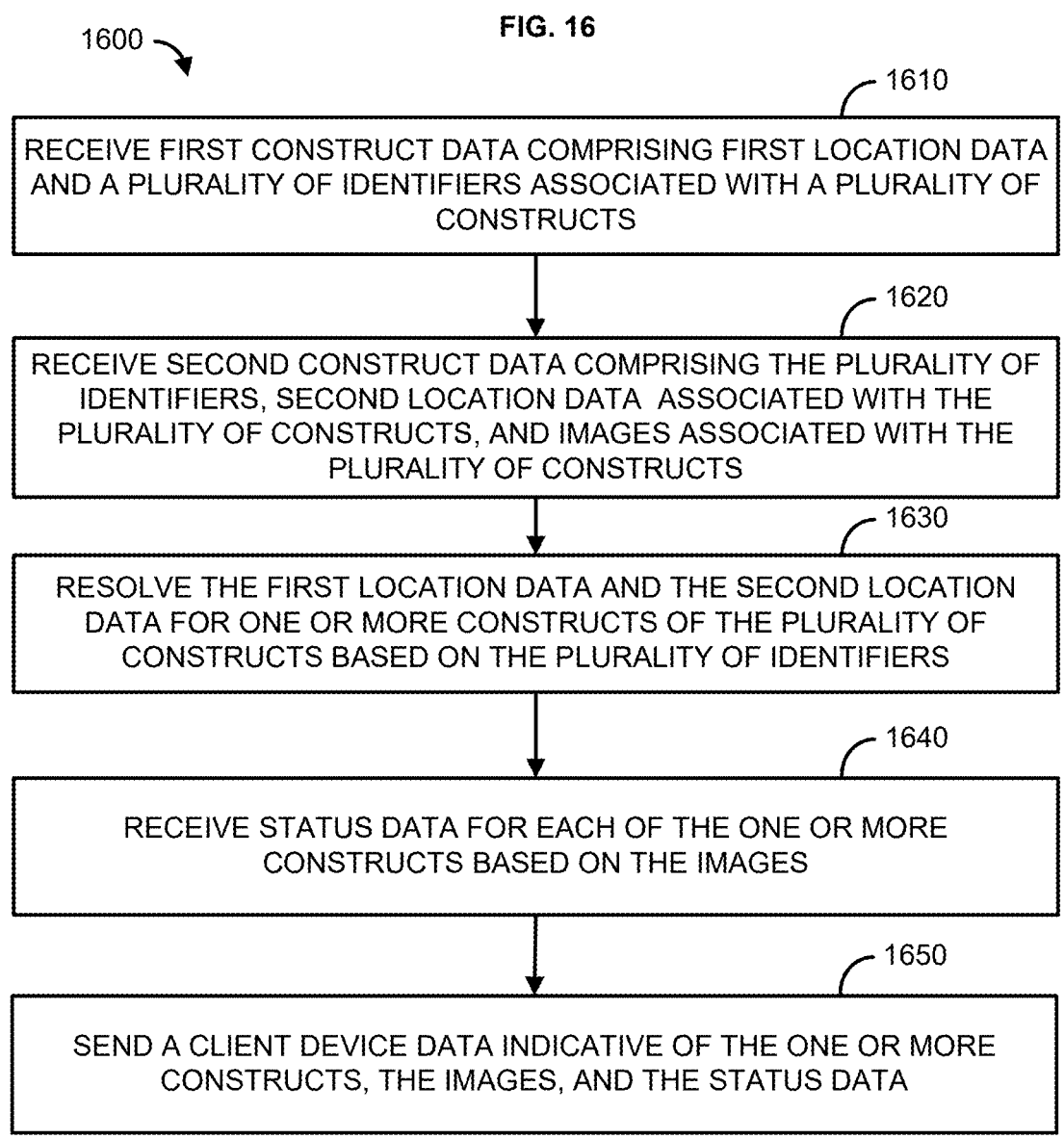

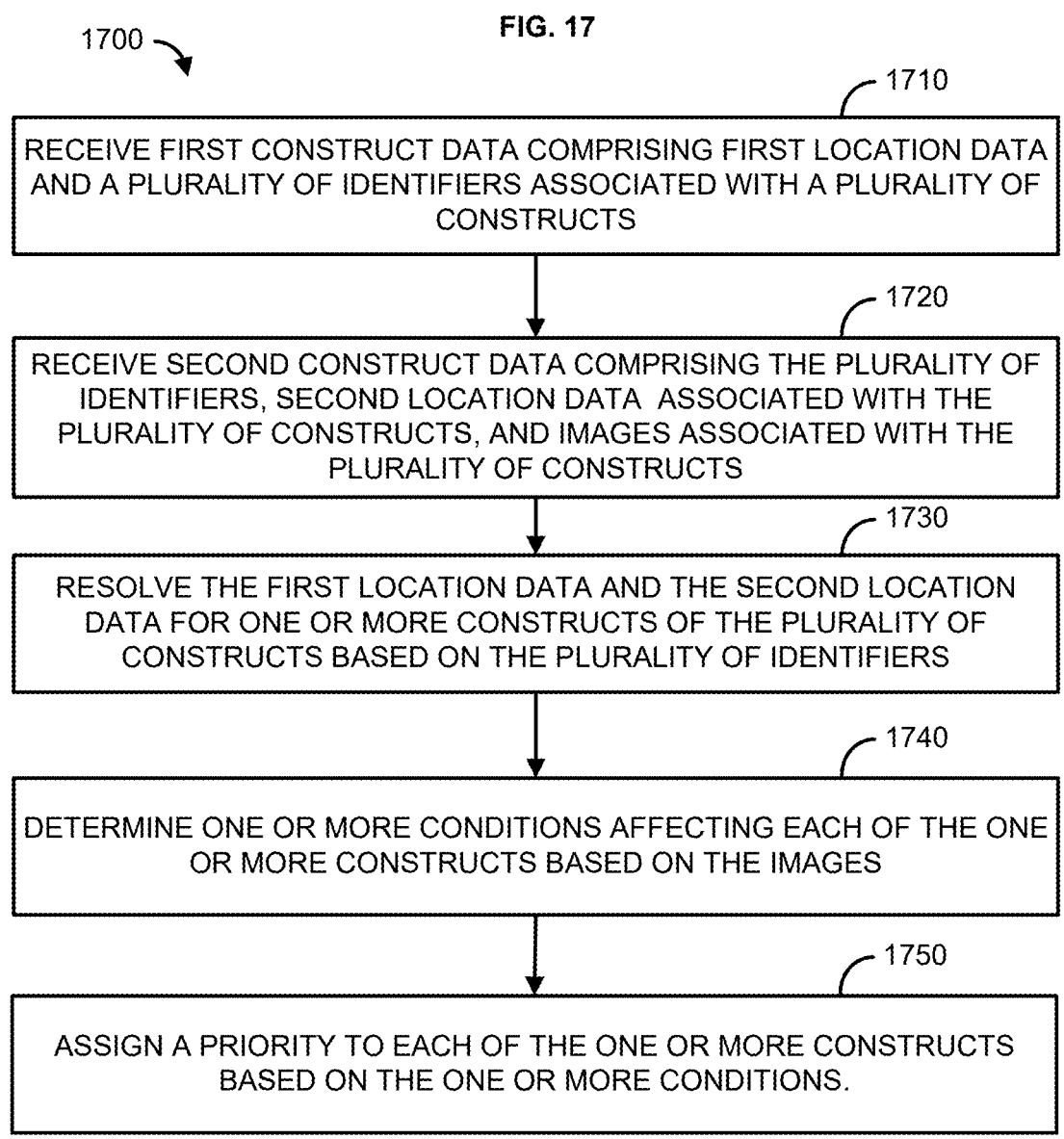

METHODS AND SYSTEMS FOR CONSTRUCT IDENTIFICATION AND ANALYSIS

CROSS-REFERENCE TO RELATED PATENT APPLICATION

This application is a continuation of U.S. patent application Ser. No. 17/335,995, filed Jun. 1, 2021, which claims priority to U.S. Provisional Application No. 63/032,482 filed May 29, 2020, herein incorporated by reference in their entireties.

BACKGROUND

Utility constructs are essential to modern utility and communication infrastructures. Accordingly, utility constructs, such as utility poles, are ubiquitous. For example, there is an estimated 180 million utility poles around the United States. Ensuring the structural and/or functional integrity of utility constructs is critical to modern utility infrastructure. Ensuring the structural and/or functional integrity of utility constructs requires routine comprehensive assessment/inspection, from ground level upward, to identify adverse conditions such as wood rot, arc damage, flashing, tracking, floating conductors, loose tie-wires, loose hardware, and/or the like. Since utility constructs are routinely owned/operated by various service providers, information used to locate and/or identify utility constructs may be non-uniform and/or service provider-specific. Routine comprehensive assessment/inspection of utility constructs may be challenging when the information used to locate utility constructs for assessment/inspection is outdated, modified, and/or is otherwise incorrect. As such, aggregating assessment/inspection data into an easily digestible format is a difficult task.

SUMMARY

It is to be understood that both the following general description and the following detailed description are exemplary and explanatory only and are not restrictive. Methods and systems for construct identification and analysis are described. Data/information relating to a plurality of constructs (e.g., utility constructs, utility assets, power poles, telephone poles, etc.), such as image data/information, location data/information, status/condition data/information, identification data/information, and/or the like, may be received/compiled (e.g., used to generate a dataset, etc.) from a plurality of devices. The plurality of devices may be operated, for example, by one or more field technicians and/or may operate autonomously. The data/information relating to the plurality of constructs may be obtained through inspection of the plurality of constructs. Inspection of the plurality of constructs may be performed, for example, manually/visually by the one or more field technicians and/or by a remote-controlled vehicle and/or mobile platform operated by the one or more field technicians (or autonomously). The data/information relating to the plurality of constructs may be compared to and/or reconciled with preexisting and/or predefined data/information relating to the plurality of constructs, such as preexisting and/or predefined (e.g., service provider defined, etc.) identification and/or location data/information, to generate one or more maps that accurately detail the location, status, and/or the like of the plurality of constructs.

The one or more maps (and related information) may be used to systematically identify, categorize, and rank conditions affecting utility infrastructures and/or systems. For example, the one or more maps (and related information) may be used to generate a report of prioritized defects and risk assessment relating to each of the plurality of constructs.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIG. 12 shows a flowchart of a method for construct identification and analysis;
FIG. 13 shows a flowchart of a method for construct identification and analysis;
FIG. 14 shows a flowchart of a method for construct identification and analysis;
FIG. 15 shows a flowchart of a method for construct identification and analysis;
FIG. 16 shows a flowchart of a method for construct identification and analysis;
and
FIG. 17 shows a flowchart of a method for construct identification and analysis.

DETAILED DESCRIPTION

Figure 1A:
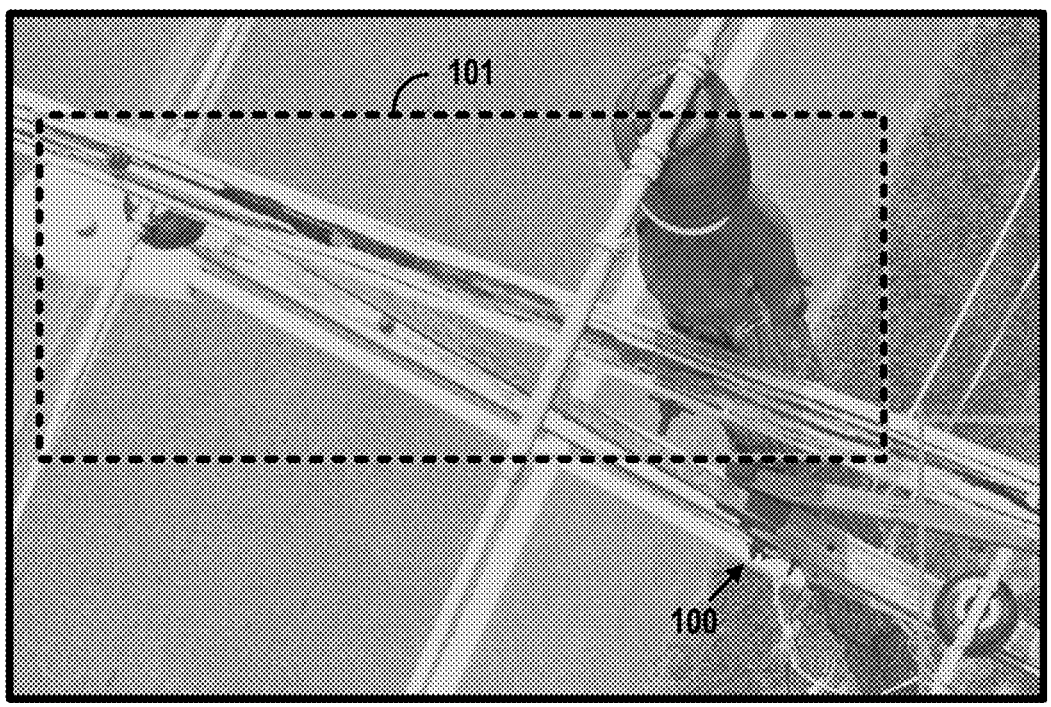
FIG. 1A shows an example image of a construct.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

While described herein in the context of primarily electric utility constructs, such description is merely used as an example. The methods and systems described herein may be applied to other utility constructs such as gas and/or water. The methods and systems described herein may also be applied outside the utility construct context, for example, any infrastructure context, such as telecommunications, railroad, highways, bridges, pipelines, and the like.

Methods and systems for construct identification and analysis are described. Data/information relating to a plurality of constructs (e.g., utility constructs, utility assets, power poles, telephone poles, etc.), such as image data/information, location data/information, status/condition data/information, identification data/information, and/or the like, may be received/compiled from a plurality of devices. The plurality of devices may include, for example, cameras (e.g., high-definition/resolution cameras, etc.), global positioning system (GPS) sensors, thermal sensors, light detection and ranging (LiDAR) sensors, multispectral sensors, digital pole integrity testing devices, and the like. For example, the plurality of devices may include inspection tools that yield digitized data from which the health and structural integrity of wooden poles and/or constructs can be assessed. For example, the plurality of devices may be used to measure resistance during drilling of wooden poles and/or constructs, measure sound velocity associated with of wooden poles and/or constructs, and/or the like. The plurality of devices may include any device and/or component used to determine integrity, status, and/or the like of a construct based on any technique/method. In an aspect, the plurality of devices may be mounted on and/or associated with a manned vehicle, an unmanned vehicle, a stationary platform, a mobile platform, and/or the like. Vehicles and/or platforms to which the plurality of devices are mounted may be directly controlled, remote-controlled, autonomous, and/or semi-autonomous. For example, platforms to which the plurality of devices may be mounted, attached, and/or associated with may include a traditional ground-based vehicle, an unmanned aerial system (UAS)/unmanned aerial vehicle (UAV), an unmanned ground vehicle (UGV), an autonomous/semi-autonomous nautical vehicle, and/or the like. The remote-controlled vehicles and/or mobile platforms may be operated, for example, by one or more field technicians. The plurality of devices may include hand-held devices and/or components. The data/information relating to the plurality of constructs may be obtained through inspection of the plurality of constructs. Inspection of the plurality of constructs may be performed, for example, manually/visually by the plurality of field technicians and/or based on data/information from the plurality of devices mounted on and/or associated with the remote-controlled vehicles and/or mobile platform operated by the plurality of field technicians.

The data/information relating to the plurality of constructs may be compared to and/or reconciled with preexisting and/or predefined data/information relating to the plurality of constructs, such as preexisting and/or predefined (e.g., service provider defined, etc.) identification and/or location data/information, to generate one or more maps that accurately detail the location (e.g., GPS coordinates, geospatial data, etc.), status, and/or the like of the plurality of constructs. The one or more maps (and related information) may be used to systematically identify, categorize, and rank conditions affecting utility infrastructures and/or systems. For example, the one or more maps (and related information) may be used to generate a report of prioritized defects and risk assessment relating to each of a plurality of constructs.

Figure 1B:
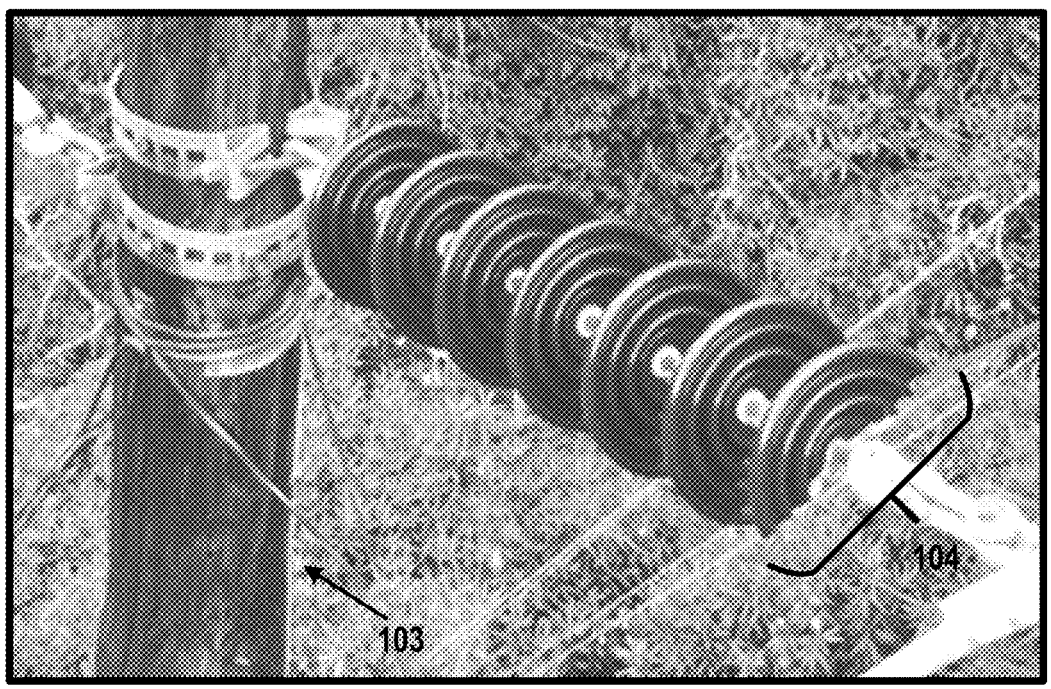
FIG. 1B shows an example image of a construct.

FIGS. 1A and 1B show common adverse conditions affecting utility constructs. FIG. 1A shows a utility pole 100 that is affected by wood rot. The utility pole 100 has a decayed crossarm 101. Wood damage, such as the decayed crossarm 101 usually does not occur overnight and/or otherwise spontaneously. The wood damage is a problem that was likely overlooked during various cycles of ground-based inspections because the damage could not be viewed from ground level. FIG. 1B shows a utility pole 103 that has a cracked insulator 104 that was likely overlooked during various cycles of ground-based inspections. Other adverse conditions affecting utility constructs include arc/flashing damage on insulators, floating conductors, loose tie-wires, loose hardware, and/or the like. Left unchecked, such adverse conditions affect the overall reliability and resiliency of utility infrastructures and/or systems.

Figure 2:
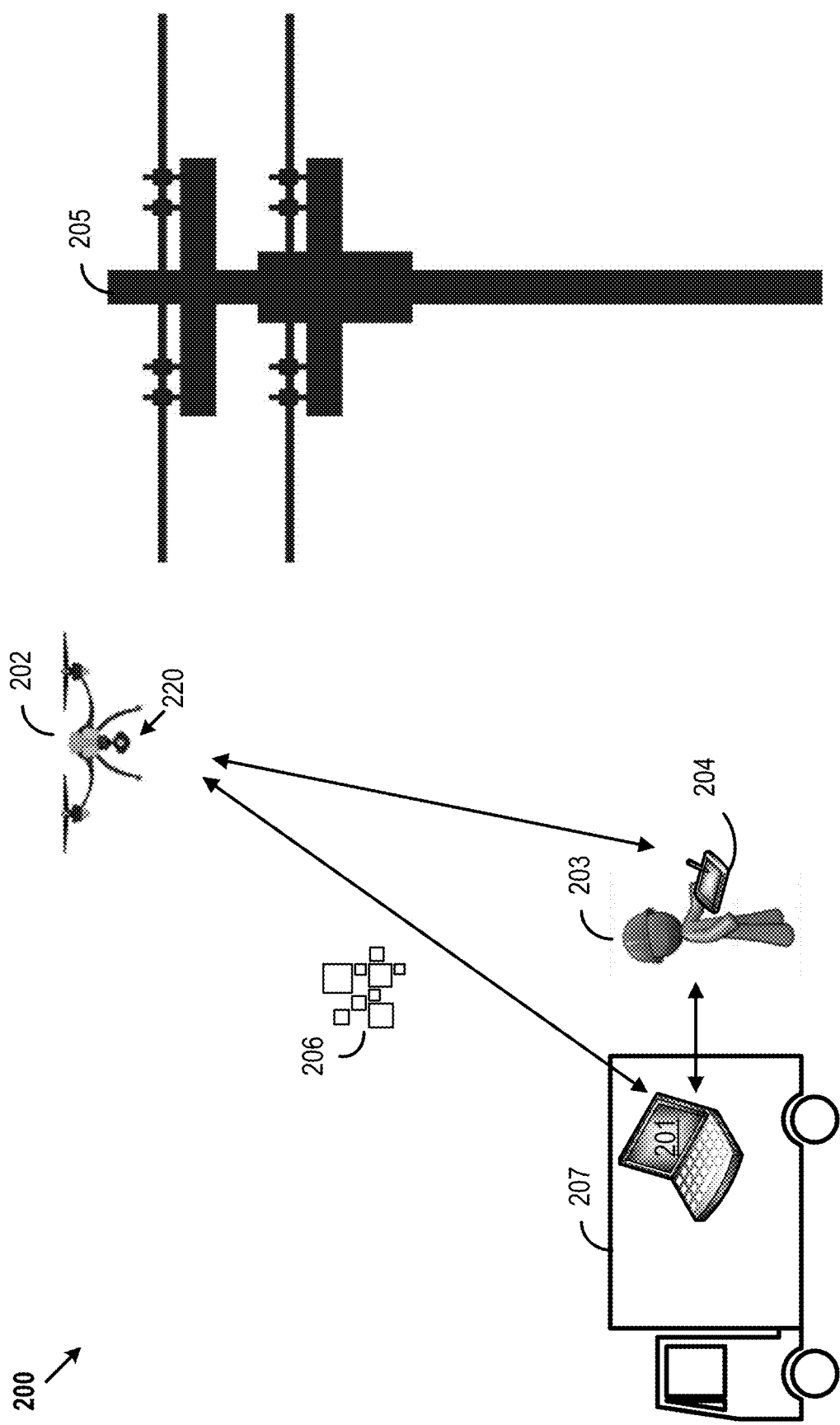
FIG. 2 shows a system for construct identification and analysis.

FIG. 2 shows a system 200 for construct identification and analysis. A user device 201 (e.g., a computing device, a smart device, a data acquisition device, etc.) may compile data/information associated with a plurality of constructs (e.g., utility constructs, utility assets, power poles, telephone poles, etc.). For example, the user device 201 may receive data/information associated with one or more constructs from an unmanned aerial vehicle (UAV) 202. The UAV 202 may perform manual, semi-autonomous, and/or fully autonomous flights/missions, such as data acquisition and inspection flights/missions, to determine, confirm, and/or update data/information associated with one or more constructs of the plurality of constructs.

A user 203, such as a field technician, a field operations member, and/or the like may control the UAV 202, or another data gathering system, for aerial data acquisition with respect to a construct 205 (e.g., a utility construct, a utility asset, a power pole, a telephone pole, etc.). The user device 201 may be a portable device, such as a device carried by the user 203, or may be configured within a vehicle operated by the user 203, such as a service truck 207. An interface 204 (e.g., a smart device, a wireless/remote controller, etc.) may be configured/associated with and/or in communication with the user device 201 and/or the UAV 202. The user 203 may use the interface 204 to control and/or operate the UAV 202. In some instances, the user device 201 may be used to control and/or operate the UAV 202. The UAV 202 may execute flights based on specifications (e.g., construct location and identification specifications, construct inspection specifications, etc.) associated with the construct 205 (and with regulatory compliance).

The UAV 202, or another data gathering system, may be used to determine and/or confirm location data/information (e.g., GPS coordinates, geospatial data, etc.) associated with the construct 205. For example, a service provider and/or asset owner/operator may provide location information (e.g., coordinate data, etc.) associated with a plurality of constructs (e.g., utility constructs, utility assets, power poles, telephone poles, etc.). The location information may be based on data/information uploaded from a public, private, and/or regulatory database. The location information may indicate locations where constructs are assumed to be located. The user 203 may visit the locations and deploy one or more UAVs, such as the UAV 202, to validate and/or update the location information. For example, the user 203 may use service provider and/or asset owner/operator provided location information to visit a site that includes the construct 205 and deploy the UAV 202.

The UAV 202, or another data gathering system, may capture image data/information (e.g., static images, video, etc.) of any/all components of the construct 205 from multiple angles. The UAV 202 may be configured with one or more gimballed cameras/sensors (e.g., high-resolution cameras/sensors, infrared cameras/sensors, ultraviolet cameras/sensors, thermal imaging camera/sensors, LiDAR sensors, etc.) that capture image data/information relating to the construct 205 from multiple angles as the UAV 202 flies to various points around the construct 205. For example, the UAV 202 may be configured with a gimballed camera 220 (e.g., a high-resolution camera/sensor, an infrared camera/sensor, an ultraviolet camera/sensor, a thermal imaging camera/sensor, LIDAR sensor, etc.) that captures image data/information (and/or sensor data/information, etc.) relating to the construct 205 from multiple angles as the UAV 202 flies to various points around the construct 205. The camera 220 may assist the user 203 with navigating the UAV 202. The UAV 202 may store image data/information relating to the construct 205 as the UAV 202 flies to various points around the construct 205, for example, in temporary storage (e.g., memory card, SD card, etc.). The image data/information may be transferred and/or uploaded to the user device 201. In some instances, the image data/information may be sent to the user device 201 as the image data/information is captured by the UAV 202, for example, in real-time.

The image data/information may include date and time information that indicates when images/videos are captured/taken, as well as GPS coordinates associated with where the images/videos are captured/taken. Machine learning and/or an analysis algorithm may be used to determine a location (e.g., GPS coordinates, etc.) of the construct 205 based on the GPS coordinate information associated with the image data/information relating to the construct 205.

In an embodiment, one or more methods may be used to determine an actual location of a construct. By way of example, gimbal pitch associated with an image may be used to determine the actual location of the construct, centroid analysis based on a collection of images may be used to determine the actual location of the construct, direct tagging of a given image as indicative of pole location at the time it is taken may be used to determine the actual location of the construct, and determination of an image that is taken from over the pole, usually via computer vision, may be used to determine the actual location of the construct. Any of these methods for location determination as described herein may be used with any other methods described herein.

In some instances, to determine an actual location of a construct, an analysis algorithm or trained machine learning model may determine/extract coordinates (e.g., GPS coordinates, etc.) from one or more images of the construct. For example, one or more images of the construct may be taken from multiple angles and positions associated with the construct 205. In some instances, the coordinates (e.g., GPS coordinates, etc.) from the one or more images of the construct may be used to form a cluster/group of coordinates. The actual location of the construct 205 may be determined by determining coordinates that are at the center of the cluster/group of coordinates. The coordinates at the center of the cluster/group of coordinates (e.g., the centroid coordinates, etc.) may be the true/actual coordinates associated with the construct 205. In some instances, image notation metadata associated with the images may be reviewed to determine/identify an image that was tagged by operators performing the image data collection as likely being representative of the true/actual coordinates associated with construct 205. In some instances, camera/gimbal-specific metadata associated with the images may be reviewed to determine/identify an image containing specific camera/gimbal parameters (such as a specific gimbal pitch value) and apply those coordinates as the true/actual coordinates associated with construct 205.

In some instances, determining an actual location of the construct 205 may be based on a combination of machine learning (via the machine learning model, etc.) and action by the user 203. The machine learning model may use object recognition and/or the like (e.g., computer vision) on each of the one or more images of the construct 205 to determine/identify an image take from directly above the top of the construct 205 (e.g., a pole top, etc.). The coordinates associated with an image of the one or more images that depicts the top of the construct may be used to suggest/establish a location of a construct 205. The user 203 may review the one or more images of the construct 205 to identify, confirm or update the image of the one or more images determined to depict the top of the construct 205.

The UAV 202, or another data gathering system, may also be used to inspect the construct 205, identify components present on the construct, the attributes of these components (such as the location of a given component relative to another), and identify any adverse conditions that could affect the performance, integrity, and/or resiliency of the construct 205. For example, the UAV 202 may capture image data/information that may be analyzed to identify any adverse conditions such as such as wood rot, arc damage, flashing, tracking, floating conductors, loose tie-wires, loose hardware, and/or the like. The adverse conditions may be determined/identified via manual inspection of the image data/information, machine learning, computer vision, combinations thereof, and/or the like.

The UAV 202, or another data gathering system, may be configured with multiple sensors that collect data/information relating to the construct 205 from multiple angles as the UAV 202 flies to various points around the construct 205. For example, the UAV 202 may be configured with thermal sensors, light detection and ranging (LiDAR) sensors, multispectral sensors, and or the like that collect data/information relating to the construct 205 from multiple angles as the UAV 202 flies to various points around the construct 205.

The UAV 202, or another data gathering system, may send data 206 to the user device 201. The data 206 may include any image data/information and/or sensor data/information captured by the UAV 202. The user device 201 may send the data 206 to a computing device (e.g., a cloud server, a smart device, a central device, data analytics device, etc.) for comprehensive analysis. In some instances, the user device 201 may be used to review, verify, and analyze the data 206. The user device 201 may display the data 206 and the user 203 may review, analyze, modify, update, and/or the like the data 206. For example, the user 203 may review one or more images of the construct 205 and/or components of the construct 205 to determine if the UAV 202 should capture additional image data/information based on a modified flight plan and/or or the like.

Figure 3A:
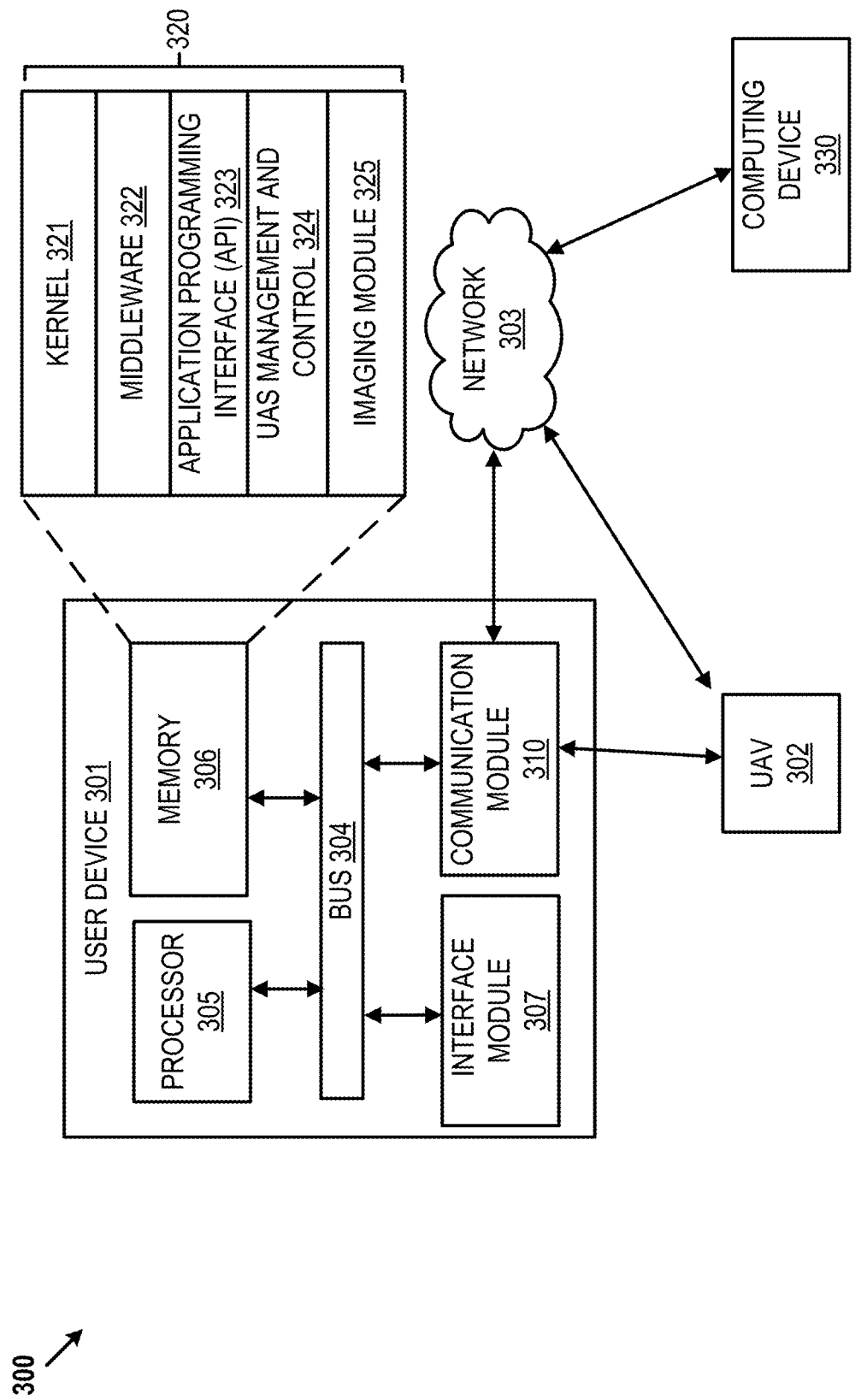
FIG. 3A shows a system for construct identification and analysis.

FIG. 3A shows a system 300 for construct identification and analysis. A user device 301 (e.g., a smart device, a data acquisition device, a computing device, the user device 201, the interface 204, etc.) may compile data/information associated with a plurality of constructs (e.g., utility constructs, utility assets, power poles, telephone poles, etc.). For example, the user device 301 may be in communication with an unmanned aerial vehicle (UAV) 302, or another data gathering system. The UAV 302 may perform manual, semi-autonomous, and/or fully autonomous flights/missions, such as data acquisition and inspection flights/missions, to determine, confirm, and/or update data/information associated with one or more constructs of the plurality of constructs. In some instances, the system 300 may include a plurality of UAVs, such as the UAV 302, configured to determine, confirm, and/or update data/information associated with one or more constructs of the plurality of constructs.

The user device 301 may include a bus 304, a processor 305, memory 306, an interface module 307, and a communication module 308. In some embodiments, the user device 301 may omit at least one of the aforementioned constitutional elements or may additionally include other constitutional elements. The bus 304 may include a circuit for connecting the constitutional elements of the user device 301 to each other and for delivering communication (e.g., a control message and/or data) between the constitutional elements.

The processor 305 may include one or more of a Central Processing Unit (CPU), an Application Processor (AP), and a Communication Processor (CP), and/or the like. The processor 305 may control, for example, at least one of other constitutional elements of the user device 301. The processor 305 may include processor-executable instructions that, when executed, cause the user device 301 to perform any or all of the methods and/or steps for construct identification and analysis described herein.

The interface module 307 may include one or more interfaces such as a keyboard, a pointing device (e.g., a computer mouse, remote control), an audio device (e.g., a speaker, a microphone, etc.), a camera, a joystick, a scanner, haptic sensing and/or tactile input devices, and/or the like. The interface module 307 may include one or more displays (e.g., Liquid Crystal Display (LCD) displays, Light Emitting Diode (LED) displays, Organic Light-Emitting Diode (OLED) displays, MicroElectroMechanical Systems (MEMS), touchscreen displays, etc.) for displaying/presenting information to a user, such as information associated with a plurality of constructs (e.g., utility constructs, utility assets, power poles, telephone poles, etc.). The one or more displays may display, for example, a variety of contents (e.g., text, image, video, icon, symbol, etc.) to a user.

The interface module 307 may include, be associated with, and/or be in communication with a graphical user interface (GUI), a web browser (e.g., Internet Explorer®, Mozilla Firefox®, Google Chrome®, Safari®, or the like), an application/API. The interface module 307 may request and/or query various files from a local source such as the memory 306 and/or a remote source, such as the UAV 302 and/or a computing device 330 (e.g., a cloud server, a smart device, a central device, a data analytics device, etc.).

The communication module 308 may establish, for example, communication between the user device 301 and any other device/component of the system 300, such as the UAV 302, the computing device 330, and/or another user device (e.g., a smart device, a data acquisition device, a computing device, the user device 201, the user device 301, etc.). The communication module 308 may utilize any suitable wired communication technique, such as Ethernet, coaxial cable, fiber optics, and/or the like. The communication module 308 may utilize any suitable long-range communication technique, such as Wi-Fi (IEEE 802.11), BLUETOOTH®, cellular, satellite, infrared, and/or the like. The communication module 308 may utilize any suitable short-range communication technique, such as BLUETOOTH®, near-field communication, infrared, and the like.

The memory 306 may include a volatile and/or non-volatile memory. The memory 306 may store, for example, a command and/or data related to at least one different constitutional element of the user device 301. The memory 306 may store software, such as an application and/or a program 320. The program 320 may be configured for construct identification and analysis. The program 320 may include, for example, a kernel 321, middleware 322, an Application Programming Interface (API) 323, an Unmanned Aircraft System (UAS) management and control program 324, an imaging module 325, and/or the like. Application programs and other executable program components such as the kernel 321, the middleware 322, the API 323, the UAS management and control program 324, and/or the imaging module 325 are shown herein as discrete blocks, although it is recognized that such programs and components may reside at various times in different storage components of the user device 301, and are executed by the one or more processors 305 of the user device 301. An implementation of the kernel 321, the middleware 322, the API 323, the UAS management and control program 324, and/or the imaging module 325 may reside on any computing device. For example, one or more of the kernel 321, the middleware 322, the API 323, the UAS management and control program 324, and/or the imaging module 325 may reside in a cloud computing environment, the UAV 302, and/or the computing device 330.

At least one part of the kernel 321, middleware 322, or API 323 may be referred to as an Operating System (OS). The memory 306 may include a computer-readable recording medium having a program recorded therein to perform the method according to various embodiment by the processor 305.

The kernel 321 may control or manage, for example, system resources (e.g., the bus 304, the processor 305, the memory 306, etc.) used to execute an operation or function implemented in other programs (e.g., the API 323, the UAS management and control program 324, the imaging module 325, etc.). Further, the kernel 321 may provide an interface capable of controlling or managing the system resources by accessing individual constitutional elements of the user device 301 in the middleware 322, the API 323, the UAS management and control program 324, and/or the imaging module 325.

The middleware 322 may perform, for example, a mediation role so that the API 145, the UAS management and control program 324, and/or the imaging module 325 may communicate with the kernel 321 to exchange data.

Further, the middleware 322 may handle one or more task requests received from the API 323, the UAS management and control program 324, and/or the imaging module 325 according to a priority. For example, the middleware 322 may assign a priority of using the system resources (e.g., the bus 304, the processor 305, or the memory 306) of the user device 301 to the UAS management and control program 324, and/or the imaging module 325. For instance, the middleware 322 may process the one or more task requests according to the priority assigned to the UAS management and control program 324, and/or the imaging module 325, and thus may perform scheduling or load balancing on the one or more task requests.

The API 323 may include at least one interface or function (e.g., instruction, etc.), for example, for file control, window control, video processing, or character control, as an interface (e.g., the interface module 307, etc.) capable of controlling a function provided by the UAS management and control program 324 and/or the imaging module 325 in the kernel 321 or the middleware 322. For example, the interface module 307 may play a role of an interface for delivering an instruction or data input from a user or a different external device(s) to the different constitutional elements of the user device 301. Further, the interface module 307 may output an instruction or data received from the different constitutional element(s) of the user device 301 to the different external device.

The user device 301 may be used to control and/or operate the UAV 302, or another data gathering system. For example, the UAS management and control program 324 may be used to configure a plurality of waypoints. The UAS management and control program 324 may be used to configure/plan manual, semi-autonomous, and/or fully autonomous flight plans (e.g., a plurality of waypoints, etc.) for the UAV 202 based on specifications associated with a plurality of constructs (e.g., utility constructs, utility assets, power poles, telephone poles, etc.), such as construct location, geospatial data (e.g., terrain information, flight restrictions, no-fly zones, etc.), construct inspection objectives, and/or the like. Once a flight plan for the UAV 302 is determined and the UAV 302 is deployed, the UAS management and control program 324 may be used to monitor and/or modify flight of the UAV 302.

The UAV 302, or another data gathering system, may be used to determine and/or confirm location data/information (e.g., GPS coordinates, geospatial data, etc.) associated with one or more constructs of a plurality of constructs (e.g., utility constructs, utility assets, power poles, telephone poles, etc.). For example, a service provider and/or asset owner/operator may provide location information (e.g., dataset, etc.), such as GPS coordinate data and/or the like, associated with a plurality of constructs (e.g., utility constructs, utility assets, power poles, telephone poles, etc.). In some instances, the location information may be based on and/or include digital pole integrity testing device data. The location information may be based on data/information uploaded from a public, private, and/or regulatory database, and/or the like. The location information may indicate locations where constructs are assumed to be located. The location information may be provided/uploaded to the UAS management and control program 324 to determine/configure a flight plan for the UAV 302. The UAV 302 may be deployed and may manually, semi-autonomously, and/or autonomously execute the flight plan.

The UAV 302, or another data gathering system, may capture image data/information (e.g., static images, video, etc.) of any/all components of the one or more constructs from all angles. For example, the UAV 302 may be configured with one or more gimballed cameras/sensors (e.g., high-resolution cameras/sensors, infrared cameras/sensors, ultraviolet cameras/sensors, thermal imaging camera/sensors, LiDAR sensors, etc.) that capture image data/information relating to one or more constructs (e.g., utility constructs, utility assets, power poles, telephone poles, etc.) from multiple angles as the UAV executes a flight plan. The imaging module 325 may be a host for and/or facilitate any computer-based image analysis capabilities. The imaging module 325 may include artificial intelligence (e.g., a trained machine learning model, etc.) configured for vision recognition, object recognition, and/or the like that enables components of one or more constructs (e.g., utility constructs, utility assets, power poles, telephone poles, etc.) to be determined/identified, for example in real-time. Signs/tags of the components may be included with the image data/information. The image data/information may include date and time information that indicates when images/videos are captured/taken, as well as GPS coordinates associated with where the images/videos are captured/taken. The UAV 302 may send the image data/information to the user device 301. The user device 301 may receive, store, and/or process the image data/information via the imagine module 325. Although not shown for simplicity, computer vision (and other forms of "intelligence") may be embedded or enabled on any component of the user device 301, the computing device 330, the UAV 302, and/or any other device/component of the system 300 to enable, facilitate, and/or support construct identification and analysis.

Image data/information captured by the UAV 302, or another data gathering system, may be used to identify components present on the construct, the attributes of these components (such as the location of a given component relative to another), and/or to identify any adverse conditions that could affect the performance, integrity, and/or resiliency of the one or more constructs (e.g., utility constructs, utility assets, power poles, telephone poles, etc.). For example, the image data/information may include static images and/or video that may be analyzed to identify any adverse conditions affecting the one or more constructs such as wood rot, arc damage, flashing, tracking, floating conductors, loose tie-wires, loose hardware, and/or the like. In some instances, the adverse conditions may be determined/identified via manual inspection of the image data/information. For example, the interface module 307 may be used to display and/or review the image data/information. In some instances, the adverse conditions may be determined/identified based on the include artificial intelligence (e.g., a trained machine learning model, etc.) configured with the imaging module 325. The image data/information may include notes and/or observations associated with a construct associated with the one or more constructs (e.g., utility constructs, utility assets, power poles, telephone poles, etc.), such as notes/alerts automatically generated by the artificial intelligence of the imaging module 325, and/or notes/observations associated with the image data/information by a user manually reviewing the image data/information Image data/information captured by the UAV 302, or another data gathering system, may include additional data/information, such as telemetry data/information associated with the UAV 302 and/or data/information from one or more sensors associated with the UAV 302. The UAV 202 may be configured with multiple sensors that collect data/information relating to a construct (e.g., a utility construct, a utility asset, a power pole, a telephone pole, etc.) from multiple angles as the UAV 302 flies to various points around the construct. For example, the UAV 302 may be configured with thermal sensors that may identify thermal issues associated with a construct, such as overheating components. The UAV 302 may be configured with light detection and ranging (LiDAR) sensors that may identify issues such as vegetation encroaching a construct and/or components of the construct. The UAV 302 may be configured with any other type of imaging sensor, such as multispectral sensors and/or the like that collect data/information relating to the construct from multiple angles as the UAV 302 flies around the construct.

The UAV 302, or another data gathering system, may send image data/information (and/or sensor data/information) to the user device 301. For example, the UAV 302 may send raw image data/information (and/or raw sensor data/information) to the user device 301. The user device 301 may use the communication module 308 to send, via a private and/or public network 303 (e.g., the Internet, a wide area network, a local area network, a cellular network, a satellite network, etc.), the raw image data/information (and/or raw sensor data/information) to the computing device 330 (e.g., a cloud server, a smart device, a central device, a data analytics device, etc.) for comprehensive analysis. Some and/or all analysis performed on the image data/information (and/or sensor data/information) may be performed by the computing device 330 and/or other computing device remote from the UAV 302 and/or the user device 301.

For example, the computing device 330 may use machine learning and/or an analysis algorithm to determine the location (e.g., GPS coordinates, etc.) of the one or more constructs (e.g., utility constructs, utility assets, power poles, telephone poles, etc.) based on the GPS coordinate information associated with the image data/information. The computing device 330 may be configured with one or more computer vision tools, applications, and/or programs to identify adverse conditions and/or anomalies affecting the one or more constructs.

The computing device 330 may be configured to generate, store, maintain, and/or update various data structures including a database providing for storage of one or more protocols, notes, and/or observations associated with the image data/information (and/or sensor data/information) received from the user device 301. The computing device 330 may generate, store, maintain, and/or update various data structures used to categorize data associated with the image data/information (and/or sensor data/information), such as fault identification, tasks, priority levels, actions, and/or the like associated with the one or more constructs (e.g., utility constructs, utility assets, power poles, telephone poles, etc.).

Figure 3B:
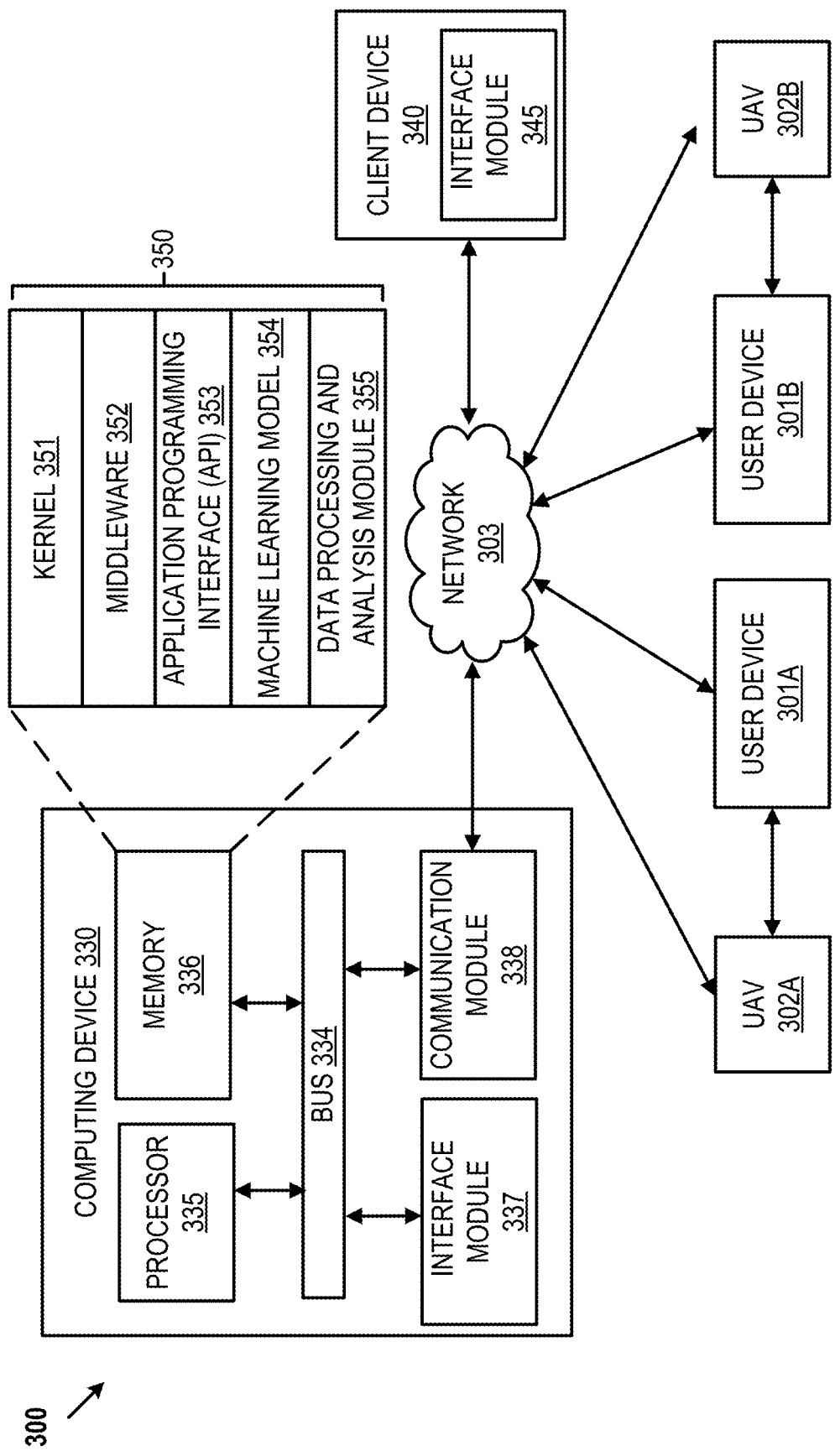
FIG. 3B shows a system for construct identification and analysis.

FIG. 3B shows the system 300 for construct identification and analysis. The computing device 330 may receive data/information associated with a plurality of constructs (e.g., utility constructs, utility assets, power poles, telephone poles, etc.) from a plurality of user devices, such as the user device 301. For example, the system 300 may include any number of user devices 301 and/or UAVs 302, such as a user device 301A and a user device 301B in communication with UAV 302A and UAV 302B, respectively. The computing device 330 may receive raw image data/information (and/or raw sensor data/information) from each the user device(s) 301A and 301B.

The computing device 330 may include a bus 334, a processor 335, memory 336, an interface module 337, and a communication module 308. In some embodiments, the computing device 330 may omit at least one of the aforementioned constitutional elements or may additionally include other constitutional elements. The bus 334 may include a circuit for connecting the constitutional elements of the user device 331 to each other and for delivering communication (e.g., a control message and/or data) between the constitutional elements.

The processor 335 may include one or more of a Central Processing Unit (CPU), an Application Processor (AP), and a Communication Processor (CP), and/or the like. The processor 335 may control, for example, at least one of other constitutional elements of the computing device 330. The processor 335 may include processor executable instructions that, when executed, cause the computing device 330 to perform any or all of the methods and/or steps for construct identification and analysis described herein.

The interface module 337 may include one or more interfaces such as a keyboard, a pointing device (e.g., a computer mouse, remote control), an audio device (e.g., a speaker, a microphone, etc.), a camera, a joystick, a scanner, haptic sensing and/or tactile input devices, and/or the like. The interface module 337 may include one or more displays (e.g., Liquid Crystal Display (LCD) displays, Light Emitting Diode (LED) displays, Organic Light-Emitting Diode (OLED) displays, MicroElectroMechanical Systems (MEMS), touchscreen displays, etc.) for displaying/presenting information to a user, such as information associated with a plurality of constructs (e.g., utility constructs, utility assets, power poles, telephone poles, etc.). The one or more displays may display, for example, a variety of contents (e.g., text, image, video, icon, symbol, etc.) to a user.

The interface module 337 may include, be associated with, and/or be in communication with a graphical user interface (GUI), a web browser (e.g., Internet Explorer®, Mozilla Firefox®, Google Chrome®, Safari®, or the like), an application/API. The interface module 337 may request and/or query various files from a local source such as the memory 336 and/or a remote source, such as user device 301 and/or a client device 340 (e.g., a smart device, a laptop/computer, etc.). Although only one client device 340 is shown, the system 300 may include any number of client devices.

The communication module 338 may establish, for example, communication between the computing device 330 and any other device/component of the system 300, such as the user device(s) 301, and/or the client device 340. The communication module 338 may utilize any suitable wired communication technique, such as Ethernet, coaxial cable, fiber optics, and/or the like. The communication module 338 may utilize any suitable long-range communication technique, such as Wi-Fi (IEEE 802.11), BLUETOOTH®, cellular, satellite, infrared, and/or the like. The communication module 338 may utilize any suitable short-range communication technique, such as BLUETOOTH®, near-field communication, infrared, and the like.

The memory 336 may include a volatile and/or non-volatile memory. The memory 336 may store, for example, a command and/or data related to at least one different constitutional element of computing device 330. The memory 336 may store software, such as an application and/or a program 350. The program 350 may be configured for construct identification and analysis. The program 320 may include, for example, a kernel 351, middleware 352, an Application Programming Interface (API) 353, a machine learning model 354, a data processing and analysis module 355, and/or the like.

At least one part of the kernel 351, middleware 352, or API 353 may be referred to as an Operating System (OS). The memory 336 may include a computer-readable recording medium having a program recorded therein to perform the method according to various embodiment by the processor 335.

The kernel 351 may control or manage, for example, system resources (e.g., the bus 334, the processor 335, the memory 336, etc.) used to execute an operation or function implemented in other programs (e.g., the API 353, the machine learning model 354, the data processing and analysis module 355, etc.). Further, the kernel 351 may provide an interface capable of controlling or managing the system resources by accessing individual constitutional elements of the computing device 330 in the middleware 353, the API 353, the machine learning model 354, and/or the data processing and analysis module 355.

The middleware 322 may perform, for example, a mediation role so that the API 353, the machine learning model 354, and/or the data processing and analysis module 355 may communicate with the kernel 351 to exchange data.

Further, the middleware 352 may handle one or more task requests received from the API 353, the machine learning model 354, and/or the data processing and analysis module 355 according to a priority. For example, the middleware 352 may assign a priority of using the system resources (e.g., the bus 334, the processor 335, or the memory 336) of the computing device 330 to the machine learning model 354, and/or the data processing and analysis module 355. For instance, the middleware 352 may process the one or more task requests according to the priority assigned to the API 353, the machine learning model 354, and/or the data processing and analysis module 355, and thus may perform scheduling or load balancing on the one or more task requests.

The API 353 may include at least one interface or function (e.g., instruction), for example, for file control, window control, video processing, or character control, as an interface (e.g., the interface module 337, etc.) capable of controlling a function provided by the machine learning model 354, and/or the data processing and analysis module 355 in the kernel 351 or the middleware 352. For example, the interface module 337 may play a role of an interface for delivering an instruction or data input from a user or a different external device(s) to the different constitutional elements of the computing device 330. Further, the interface module 337 may output an instruction or data received from the different constitutional element(s) of the computing device 330 to the different external device.

The computing device 330 may be used to process and/or analyze data/information received from a user device 301 or a client device 340. The computing device 330 may process, organize, correlate, validate, update, and/or otherwise manage data/information associated with a plurality of constructs (e.g., utility constructs, utility assets, power poles, telephone poles, etc.). For example, the computing device 330 may process, organize, correlate, validate, update, and/or otherwise manage image data/information (e.g., raw image data/information and/or raw sensor data/information) received from a user device 301. For example, the computing device 330 may execute, perform, and/or facilitate any data/information analysis performed by the user device 301 (e.g., components of the user device 301, etc.). The computing device 330 may process, organize, correlate, validate, update, and/or otherwise manage any data/information associated with the raw image data/information (and/or raw sensor data/information), such as data information received from a client device 340.

The computing device 330 may determine and/or confirm location data/information (e.g., GPS coordinates, geospatial data, etc.) associated with one or more constructs of the plurality of constructs (e.g., utility constructs, utility assets, power poles, telephone poles, etc.). For example, the computing device 330 may receive data/information, such as raw image data/information (and/or raw sensor data/information), associated with the plurality of constructs from a user device 301. The data/information may include date and time information that indicates when images/videos are captured/taken, as well as GPS coordinates associated with where the images/videos are captured/taken. The raw image data/information may be provided to the machine learning model 354. The machine learning model 354 may be used to determine the true/actual coordinates associated with each construct of the plurality of constructs.

In some instances, to determine an actual location of a construct, the machine learning model 354 (and/or another component of the computing device 330, such as the processor 335, the data processing and analysis module 355, etc.) may be trained and/or used to determine/extract coordinates (e.g., GPS coordinates, etc.) from one or more images of the construct. For example, one or more images of the construct may be taken from multiple angles and positions associated with the construct. In some instances, the coordinates (e.g., GPS coordinates, etc.) from the one or more images of the construct may be used to form a cluster/group of coordinates. The actual location of the construct may be determined by determining coordinates that are at the center of the cluster/group of coordinates. The coordinates at the center of the cluster/group of coordinates (e.g., the centroid coordinates, etc.) may be the true/actual coordinates associated with the construct. In some instances, image notation metadata associated with the images may be reviewed to determine/identify an image that was tagged by operators performing the image data collection as likely being representative of the true/actual coordinates associated with construct. In some instances, camera/gimbal-specific metadata associated with the images may be reviewed to determine/identify an image containing specific camera/gimbal parameters (such as a specific gimbal pitch value) and apply those coordinates as the true/actual coordinates associated with construct.

In some instances, determining an actual location of a construct may be based on a combination of machine learning (via the machine learning model 354, etc.) and user action. For example, the coordinates (e.g., GPS coordinates, etc.) from one or more images of the construct may be used to form a cluster/group of coordinates. The machine learning model 354 may use object recognition and/or the like (e.g., computer vision) on each of the one or more images of the construct to determine/identify an image take from directly above the top of the construct (e.g., a pole top, etc.). The coordinates associated with an image of the one or more images that depicts the top of the construct may be used to suggest/establish a location of a construct. The user may review the one or more images of the construct to identify, confirm or update the image of the one or more images determined to depict the top of the construct.

A service provider and/or asset owner/operator may provide location information (e.g., a dataset, etc.), such as GPS coordinate data, associated with the plurality of constructs (e.g., utility constructs, utility assets, power poles, telephone poles, etc.). The location information may be based on data/information uploaded from a public, private, and/or regulatory database, and/or the like. The location information may include identifiers of the plurality of constructs and indicate locations where the plurality of constructs are assumed to be located. The location information may be provided/uploaded to the data processing and analysis module 355.

In an embodiment, the methods and systems disclosed can thus determine which assets/constructs (e.g., utility poles) actually exist and what the actual location is for each asset/construct. A data record indicative of an asset/construct so determined may be created. One or more images collected of the asset/construct may be associated with the data record. To the extent a service provider and/or asset owner/operator provided a dataset comprising an asset/construct data record for one or more assets/constructs, an association (or link) between the data record created by the methods and systems disclosed and an asset/construct data record in the service provider and/or asset owner/operator dataset may be created. Such an association permits reconciliation with the asset/construct data records of the service provider and/or asset owner/operator with reality.

Figure 3C:
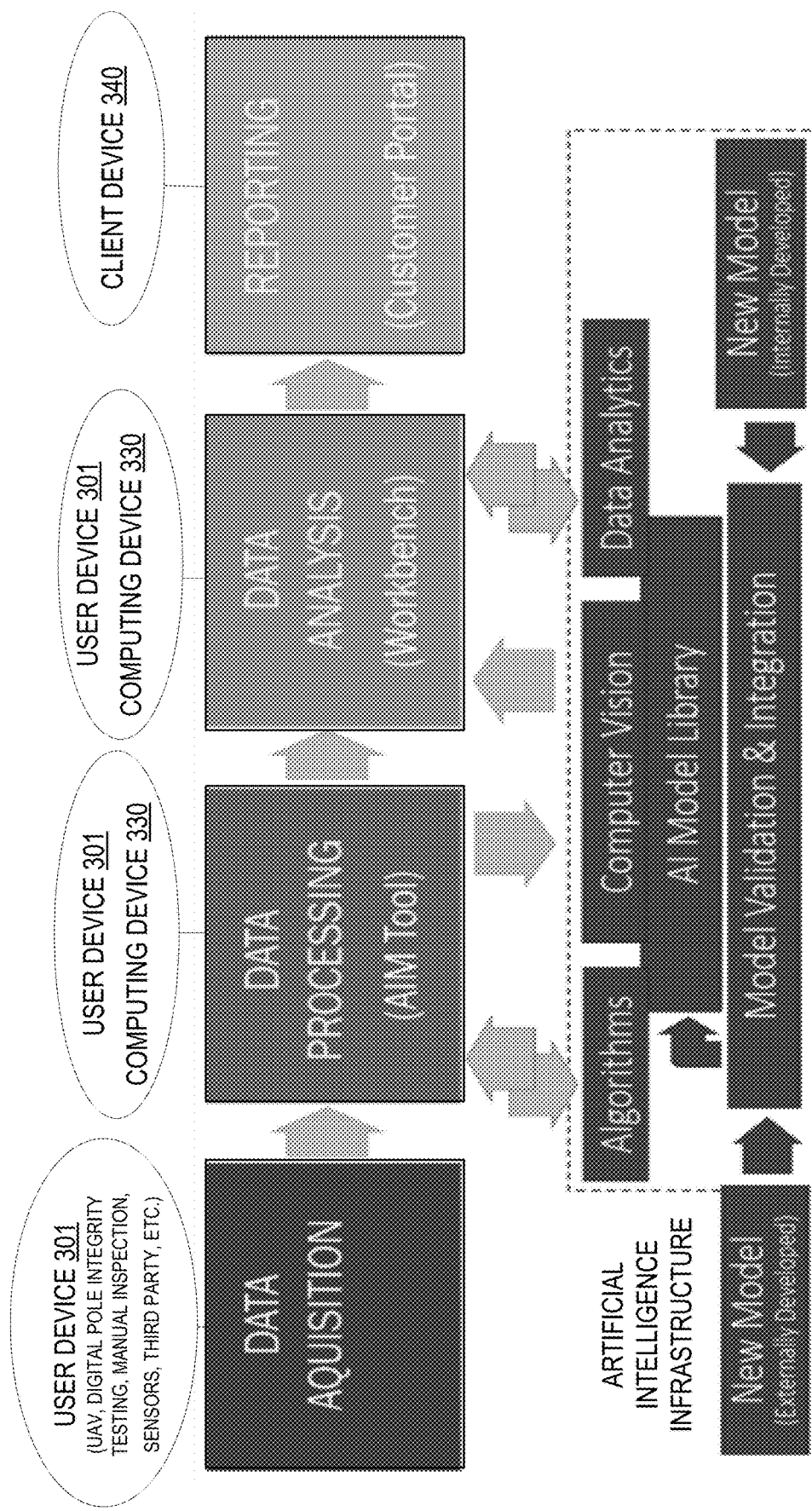
FIG. 3C shows a system for construct identification and analysis.

FIG. 3C shows a high-level operational overview of the system 300. As shown in FIG. 3C and previously described, the system 300 may support data acquisition via a variety of devices, processes, facilitations, and/or the like. For example, the user device 301 may receive and process data/information associated with constructs and/or the like via a UAV, a digital pole integrity testing device, manual inspections, one or more sensors, third-party data, and/or the like. Data processing and data analysis may be performed by the user device 301 and/or the computing device 330, separately or collectively, and may utilize a broad artificial intelligence infrastructure. The system 300 may integrate diverse data types and determine/identify correlations and associations between the diverse data types that might not be otherwise apparent. For example, the system 300 enables analysis of how the existence of certain conditions affecting a construct and/or the like (e.g., weather, location, the presence of animals, etc.) impact the existence of other conditions (e.g., wood rot, component rust/oxidation, etc.) or potential future existence of conditions. As such, diverse data types may be used to formulate correlations and predictions associated with constructs and/or the like. The system 300 may support data/information acquired from any source and/or in any format. As described, the system 300 may support computer vision (e.g., object detection, defect detection, machine learning model predictions, etc.) and/or traditional data analytics (e.g., correlation, prediction, etc.).

Reporting and/or data output, for example, associated with constructs may be performed via the client device 340. Reporting and/or data outputting may include intelligent arrangement and display of data/information, images/video, 3D renderings, and/or the like associated with one or more constructs.

The system 300 may support and/or perform analysis on and/or associated with one or more constructs that are supported through trained computer vision classifiers (e.g., object detectors, defect detectors), and can also generate its training data that can be used to generate new classifiers as well to refine/improve previously enabled classifiers. For example, by performing construct inspection work (e.g., a subject matter expert (SME) identifying objects and detects associated with a construct through manual effort, etc.), the system 300 may record and store annotations made during construct inspection work (e.g., the annotations the SMEs are making, etc.), compiling the annotations, and enable the annotations to be leveraged on-demand to generate new classifiers or to retrain/refine existing classifiers. For example, computer vision classifier generation and/or usage, as well as build and refinement are integrated components of the system 300.

Figure 3D:
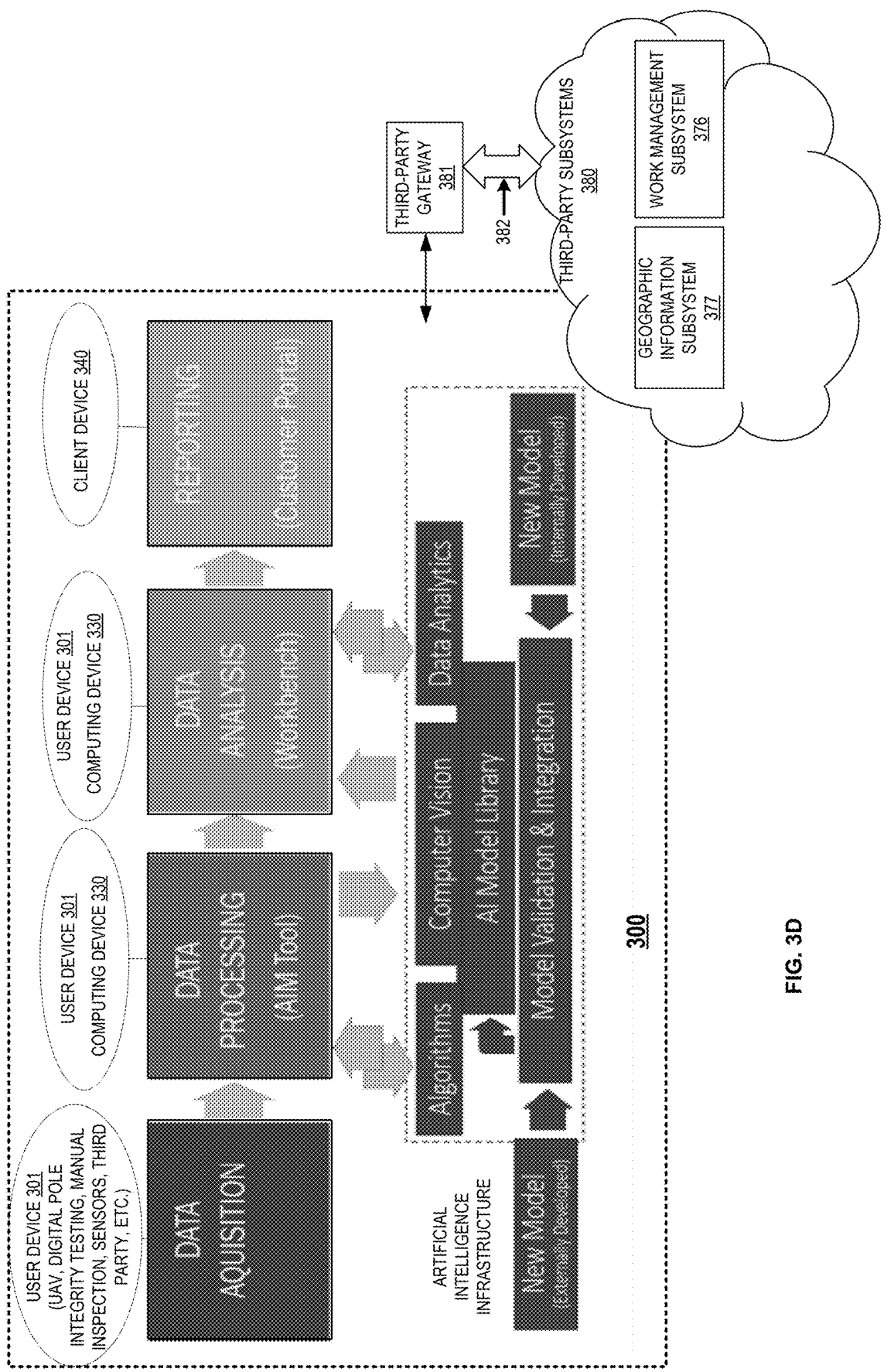
FIG. 3D shows a system for construct identification and analysis.

The system 300 may also be integrated with a third-party platform. FIG. 3D shows an example of the system 300 integrated with third-party subsystems 380, in accordance with one or more embodiments of this disclosure. Integration of the system 300 may be accomplished by functional coupling with third-party subsystems 380 via a third-party gateway 381 and a network architecture 382. The network architecture 382 may include one or a combination of networks (wireless or wireline) that permit one-way and/or two-way communication of data and/or signaling.

The third-party subsystem 380 can include various type of subsystems that permit data analytics (e.g., construct analysis, etc.) insights, reporting insights, and/or any other data/information generated and/or managed by the system 300 to be extracted and leveraged across business systems of a source platform. As is illustrated in FIG. 3D, the third-party subsystems 380 may include a work management subsystem 376, a geographic information subsystem (GIS) 377, and/or any other third-party system. The work management subsystem 376 may be configured to facilitate repair and/or inspection operations (e.g., a work order ticking system) and subsequent tracking. The GIS subsystem 377 may be configured to facilitate access to, and processing of, additional geographic data, including, for example, infrastructure data such as utility locations (e.g., gas lines, water lines, and the like), population data, elevation data, and the like. The system 300 may support the exchange of data/information with any third-party subsystem 380, for example, via extraction and/or ingestion of flat data files and/or information specifically formatted with consideration of the associated system configuration of each system and/or subsystem.

Figure 3E:
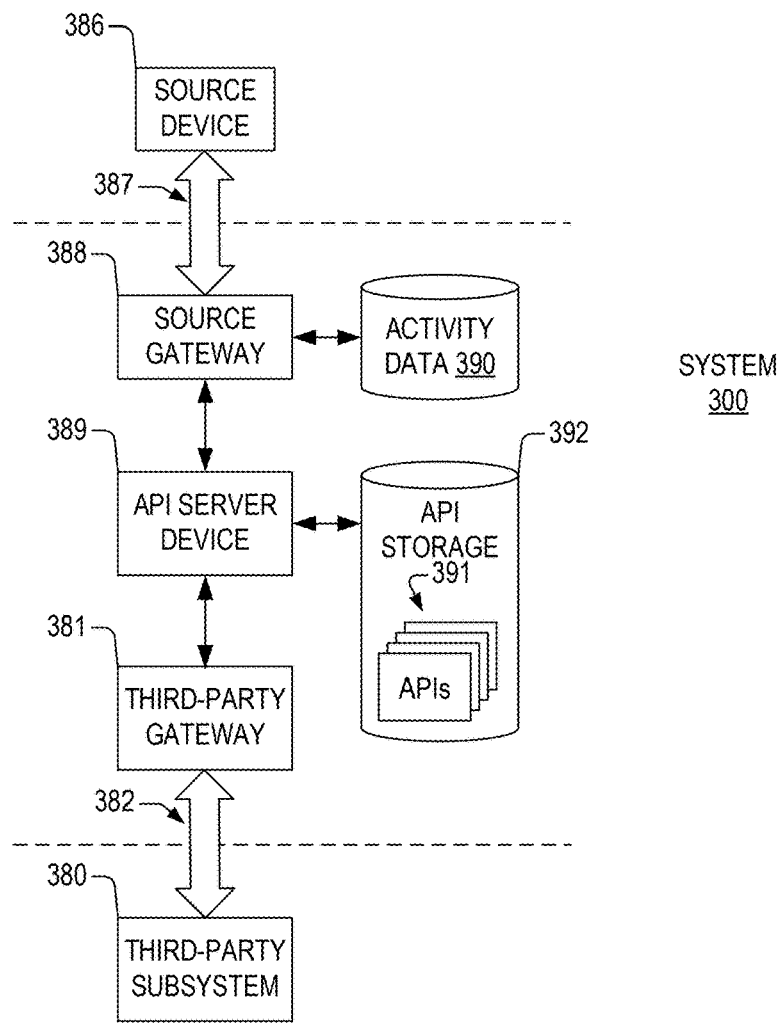
FIG. 3E shows a system for construct identification and analysis.

In an embodiment, data may be exchanged with the third-party subsystem 380 via, for example, one or more of an Application Programming Interface (API) and/or extended mark-up language (XML) files. For example, illustrated in FIG. 3E, a source device 386 can access an API server device 389 within the system 300 (FIGS. 3A-3D) via a source gateway 388. The API server device 389 may expose multiple application programming interfaces (APIs) 389 retained in API storage 392. One or many of the APIs 389 can be exposed to the source device 386 to access a third-party subsystem 380 and functionality provided by such subsystem. The exposed API(s) can permit executing respective sets of function calls. For example, a first exposed API can permit accessing a first group of function calls for defined functionality, and a second exposed API can permit accessing a second group of function calls for defined second functionality. The function calls can operate on data that is contained in the soured device 386 and/or a storage system functionally coupled to the source device 386. The function calls also can operate on data/information managed/supported and/or generated by the system 300 (e.g., construct analysis data/information, data collection system/device information, etc.), with result being pushed to the source device 386.

Data and/or signaling associated with the execution of such function calls can be exchanged between the API server device 389 and the third-party subsystem 380 via a third-party gateway 381. In addition, other data and/or signaling can be exchanged between the API server device 389 and the source device 386 via the source gateway 388.

In some cases, the API server device 389 also can expose one or many of the APIs 389 to the third-party subsystem 380. In that way, the third-party subsystem 380 (or, in some cases, a third-party device, such as a developer device) can create applications that utilize some and/or all of the functionality of the system 300.

Figure 3F:
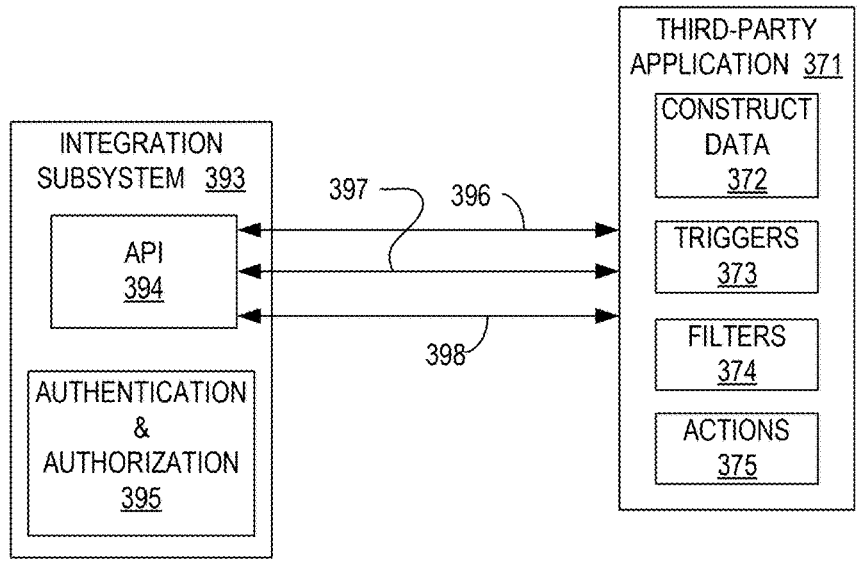
FIG. 3F shows a system for construct identification and analysis.

FIG. 3F illustrates example components of an integration subsystem 393. The integration subsystem 393 supports an ecosystem of third-party application integrations and APIs that enable data analytics (e.g., construct analysis, etc.) insights, reporting insights, and/or any other data/information generated and/or managed by the system 300. The integration subsystem 393 can include an API 394 that may be configured to exchange data with one or more third-party applications 371. The one or more third-party applications 371 may be, for example, a work management subsystem 376, a geographic information subsystem (GIS) 377, and/or any other third-party system. The third-party application 371 may be configured to leverage data received from and/or sent to the integration subsystem 393, via the API 394.

To exchange data and provide control over certain functionality via the API 394, the integration subsystem 393 may use an authentication and authorization unit 395 to generate an access token. The access token may comprise a token key and a token secret. The access token may be associated with a client identifier. Authentication for API requests may be handled via custom HTTP request headers corresponding to the token key and the token secret. The client identifier may be included in the path of an API request URL.

The API 394 may comprise a set of routines, protocols, and/or tools for building software applications. The API 394 may specify how software components should interact. For example, the API 394 may be configured to send data 396, receive data 397, and/or synchronize data 398. In some cases, the API 394 may be configured to send data 396, receive data 397, and/or synchronize data 398 in substantially real-time, at regular intervals, as requested, and/or the like. The API 394 may be configured to provide the one or more third-party applications 371 the ability to submit, access, manipulate, and/or perform actions based on construct identification and/or analysis data/information. For example, The API 394 may be configured to provide the one or more third-party applications 371 the ability to facilitate, based on the one or more conditions affecting a construct, repair to the construct, a modification to the construct, an update to the construct, and/or the like. For example, the work management subsystem 376, may be enabled to schedule, verify, and/or manage maintenance and/or evaluation of a construct.

The integration subsystem 393, via the API 394, may be configured to deliver any data/information to the third-party application 371 to update construct data/information 372. The third-party application 371 can use construct data/information 372 for image analysis/segmentation, construct status/profiling, construct identification, data/information qualification, and/or any other use.

The integration subsystem 393, via the API 394, may be configured to enable the third-party application 371 to use data provided by the integration subsystem 393, via the API 394, to automate workflows. Construct data/information and/or the like associated with the system 300 may be provided to the third-party application 371 for use in setting one or more triggers 373, filters 374, and/or actions 375. The third-party application 371 may configure a trigger 373. The trigger 373 may be a data point and/or an event, the existence of which may cause an action 375 to occur. The third-party application 371 may configure a filter 374. The filter 374 may be a threshold or similar constraint applied to the data point and/or the event to determine whether any action 375 should be taken based on occurrence of the trigger 373 or determine which action 375 to take based on occurrence of the trigger 373 (e.g., request and/or dispatch a technician, service person, data collection/analysis team, and/or the like to a construct location, etc.). The third-party application 371 may configure an action 375. The action 375 may be an execution of a function, such as updating a database, sending an email, requesting/providing support/data for a construct, etc. The third-party application 371 may receive data (e.g., construct data, etc.) from the integration subsystem 393, via the API 394, determine if the data relates to a trigger 373, apply any filters 374, and initiate any actions 375.

Figure 4:
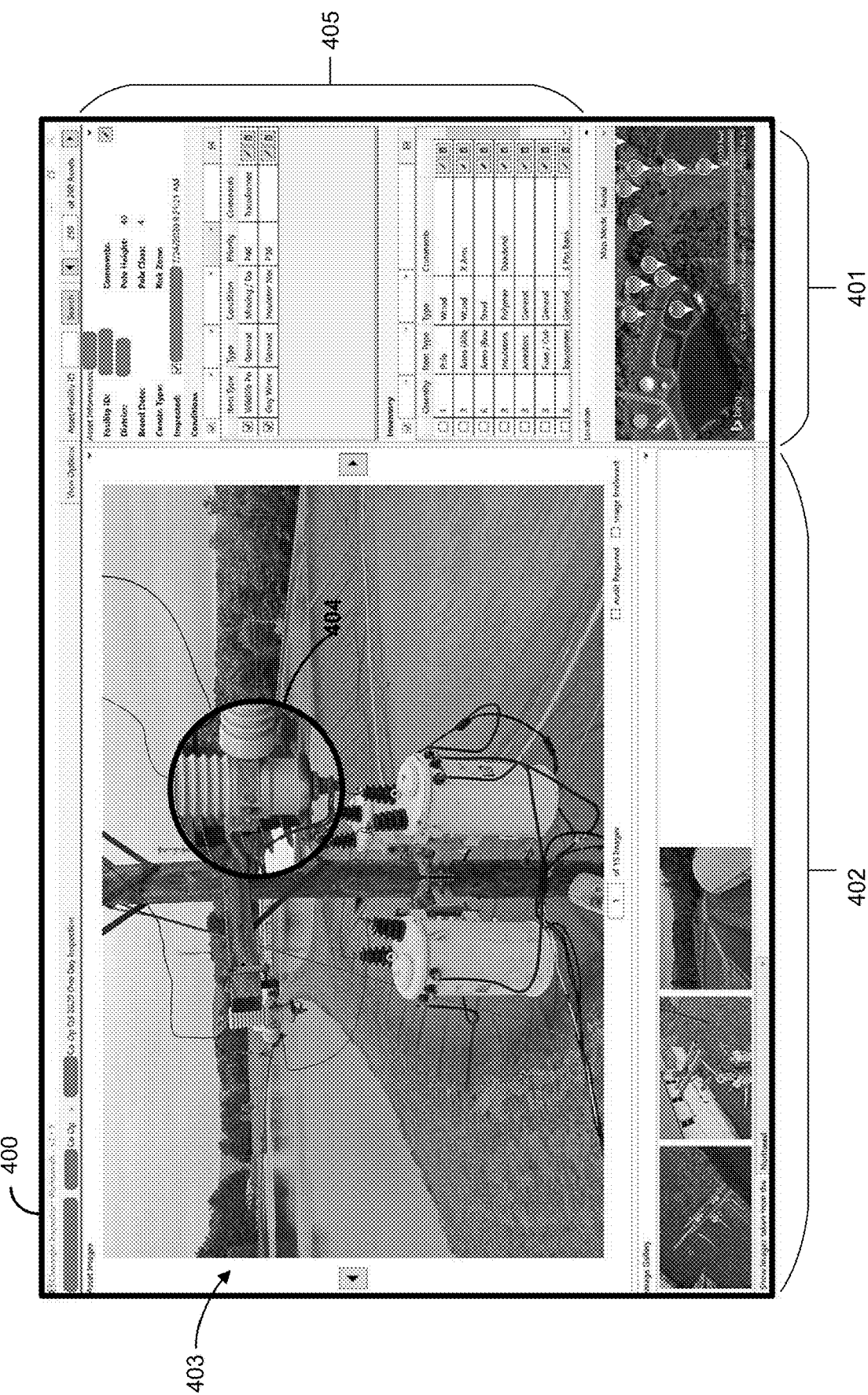
FIG. 4 shows an example user interface for construct identification and analysis.

FIG. 4 shows a user interface screen 400 (for example, of the computing device 330 and/or any other computing device described herein) that may be used for construct identification and analysis. For example, the computing device 330 may generate and output/provide the user interface via the interface module 337 based on data/information (e.g., from a user device 301, etc.) uploaded to the data processing and analysis module 355. A user interface screen 400 may be used to view images and related data/information associated with one or more constructs (e.g., utility constructs, utility assets, power poles, telephone poles, etc.). As described herein, any interface configured for display/viewing of an image, may be configured to present a movable window overlaid onto the image that allows for zooming in on the portion of the image bounded by the window. As described herein, any interface configured for display/viewing of an image, may be configured to present bounding boxes (and associated labels) that denote the location where specific components and/or defects that have been logged for the asset/construct are visible. As described herein, any interface configured for display/viewing of an image, may be configured to present a thumbnail image of a larger image. In an embodiment, interacting with the thumbnail image may retrieve/present a larger image and/or a report file related to the asset/construct. In an embodiment, interacting with the thumbnail image may retrieve/present a video, a panorama style image that user can interact with (e.g., move around and change the field of view), an interactive 3D virtualization of the asset, and/or an interactive virtualization that includes the ability to measure distance between two points on the image, etc. In an embodiment, the result of interacting with a thumbnail may be configured to present a variety of other data and/or data types and, in some instance, redirect to an external system.

The user interface screen 400 may include a map 401 with representations (e.g., icons, etc.) of the one or more constructs. An interface element (e.g., a mouse, a keyboard, a touchscreen, etc.) may be used to select a representation of a construct from the map 401. The user interface screen 400 may include a gallery of images 402. The gallery of images 402 may include images (e.g., thumbnail images, low-resolution images, etc.) of a selected construct (e.g., utility construct, utility asset, power pole, telephone pole, etc.) represented by map 401. The gallery of images 402 may be based on image data/information received from a user device 301, such as on image data/information captured by a UAV 302, or another data gathering system. The interface element (e.g., a mouse, a keyboard, a touchscreen, etc.) may be used to select an image of the construct from the gallery of images 402. A selected image 403 may be provided, for example, above the gallery of images 401. The selected image 403 (active image) may be a large-scale, high-resolution image. The interface element may be used to manipulate an interactive element 404. The interactive element 404 may be an auto-zoom window that, when moved around the selected image 403, provides a detailed, enhanced, and/or zoomed view of one or more areas of the selected image 403. The interactive element 404 may be used to manually inspect components of the construct captured within the selected image 403.

The user interface 400 may include asset data/information 405 (e.g., metadata, etc.) that is associated with the construct (e.g., utility construct, utility asset, power pole, telephone pole, etc.). The asset data/information 405 may include location information (e.g., coordinate data, etc.), identification information, and/or the like provided by a service provider and/or asset owner/operator. The asset data/information 405 may include, for example, information such as identification information (e.g., a facility identifier, etc.), locale information (e.g., an associated district, risk zone, etc.), brand date, construct type, dimensions (e.g., pole height, etc.), and/or the like. The asset data/information 405 may include any information associated with a construct. For example, the asset data/information 405 may include details of conditions affecting and/or associated with the construct, such as any adverse conditions observed via the images of the gallery of images 402. The asset data/information 405 may be edited/updated via the user interface, such as via the user interface screen 400. For example, the an interactive element, such as a check-box, may be used to indicate conditions associated with the construct that are best observed/represented via the selected image 403. An interactive element may also be used to establish or modify the level of severity associated with any given adverse condition that has been observed and recorded. Particular components and/or adverse conditions observable in a given image may be denoted via bounding boxes and associated labels overlayed onto the image. These bounding boxes and labels may be generated manually or via computer vision processes. If generated via computer vision processes the user interface will support modifications or deletions. Notably, any bounding boxes and/or labels that are "committed as final" to the database can be used to train new computer vision classifiers/models and/or retrain previously enabled computer vision classifiers/models.

In an embodiment, the user interface screen 400 may indicate a priority ranking for each construct of a plurality of constructs that has been inspected. A priority ranking may indicate a severity of any adverse condition associated with a construct. The severity may be an indication of how soon conditions associated with a construct should be addressed/resolved, a failure probability associated with an inspected construct, a maintenance requirement for an inspected construct, and/or the like. Priority rankings may be assigned automatically based on a default mapping of conditions to priorities configured specifically for a particular asset inspection event. Where default mappings exist it may be possible to perform manual adjustments. Priority rankings may be manually assigned to a construct, for example, based on manual observation/inspection of images associated with a construct.

Returning to FIG. 3B, as described, the computing device 330 uses techniques described previously to establish the true/actual coordinates associated with each construct. The computing device 330 may use the datasets associated with each construct of a plurality of constructs that each include coordinates (e.g., GPS coordinates, etc.) for a respective construct of the plurality of constructs and a dataset generated from location information, received from a service provider and/or asset owner/operator, associated with each construct of the plurality of constructs to generate a map.

Figure 5:
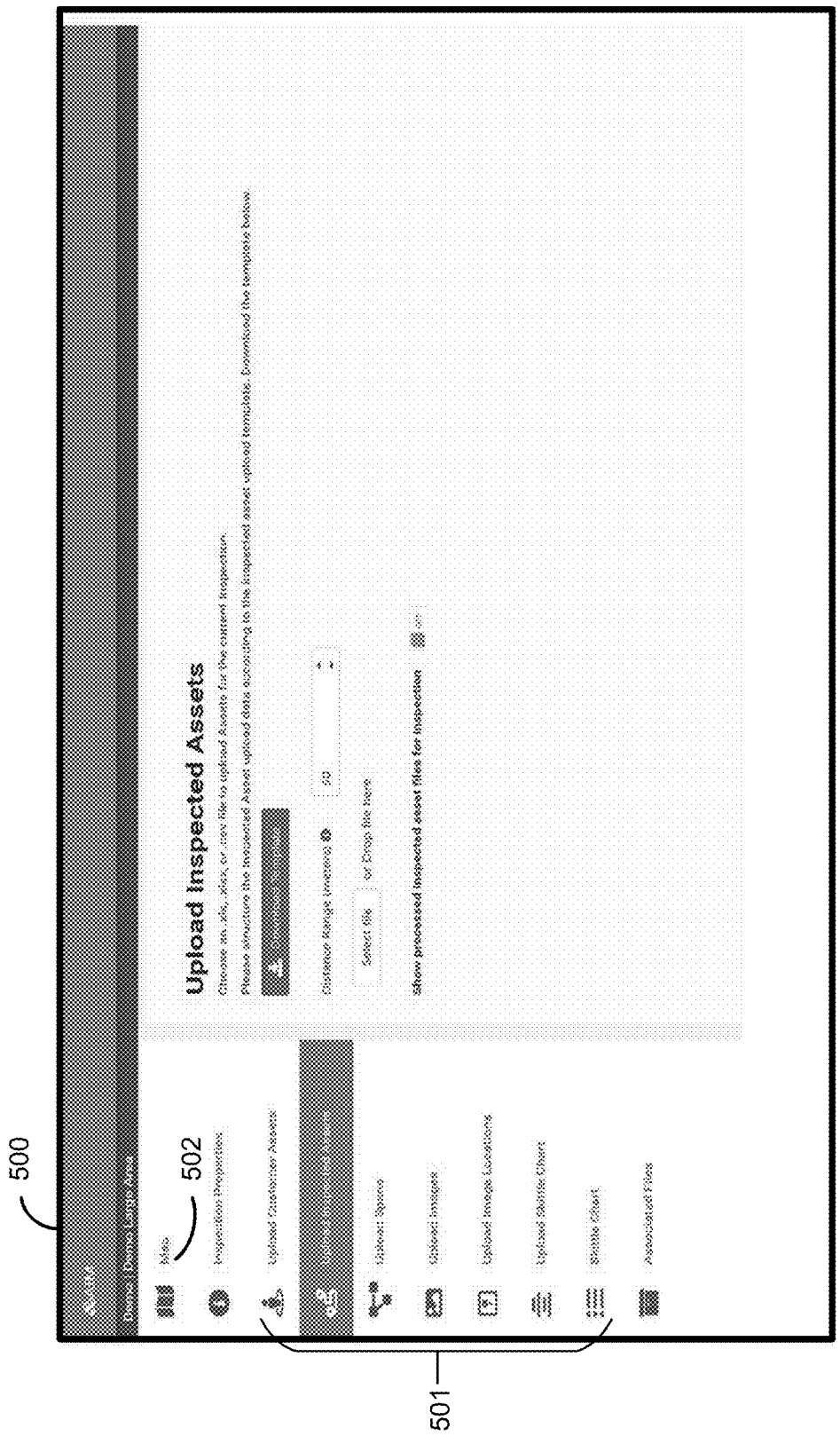
FIG. 5 shows an example user interface for construct identification and analysis.

FIG. 5 shows a user interface screen 500 (for example, of the computing device 330 and/or any other computing device described herein) that may be used for construct identification and analysis. The user interface screen 500 may be used to upload data/information (e.g., datasets, etc.) associated with inspected constructs, such as data/information (e.g., datasets, etc.) received from a user device 301. The user interface screen 500 may include an interactive element 501 that enables data/information (e.g., datasets, etc.) associated with inspected constructs to be uploaded and analyzed, for example, by the data processing and analysis module 355 and/or the machine learning model 354. The interactive element 501 enables uploading of the datasets associated with each construct of a plurality of constructs that each include coordinates (e.g., GPS coordinates, etc.) for a respective construct of the plurality of constructs and one or more datasets generated from location information, received from a service provider and/or asset owner/operator, associated with each construct of the plurality of constructs. The user interface screen 500 enables thresholds and/or parameters that will be referenced and/or associated with the datasets associated with each construct of a plurality of constructs and the one or more datasets generated from service provider provided location information and/or asset owner/operator provided location information. These include a repository of potential components, adverse conditions and the default severity to be applied to each adverse condition, applicable to a given collection of constructs. The default severity to be applied to each adverse condition is based on analysis performed against previously analyzed datasets.

Figure 6A:
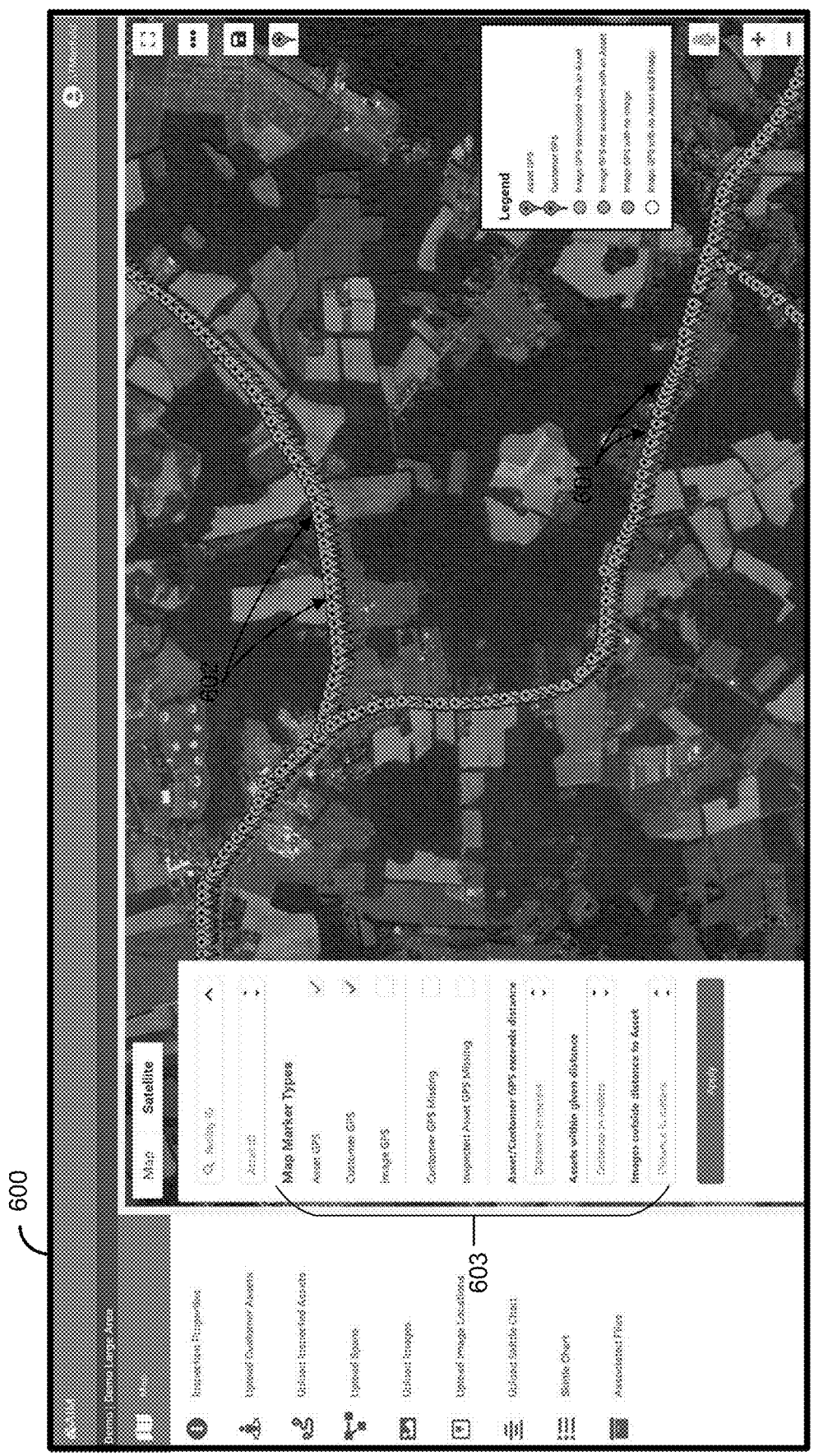
FIG. 6A shows an example user interface for construct identification and analysis.

FIG. 6A shows a user interface screen 600 (for example, of the computing device 330 and/or any other computing device described herein) that may be used for construct identification and analysis. The user interface screen 600 may include a map generated based on the selection of the interactive element 502. The map may include details associated with the locations for the plurality of constructs. For example, the map may indicate suspected/assumed coordinates/locations for the plurality of constructs as determined from the location information (e.g., dataset, etc.) received from a service provider and/or asset owner/operator, and coordinates/locations as determined by the computing device 330 based on data/information received from one or more user devices (e.g., the user device 301, etc.).

For example, the computing device 330 may reconcile/resolve location data/information determined by the computing device 330 based on data/information received from one or more user devices, with location data/information received from a service provider and/or asset owner/operator. For example, location information (e.g., dataset, etc.) received from a service provider and/or asset owner/operator may include identification information, such as a plurality of identifiers (e.g., service identifiers, facility identifiers, etc.), associated with each construct of a plurality of constructs. Datasets generated based on inspections of the plurality of constructs, such as datasets generated from data/information received from one or more user devices (e.g., the user device 301, etc.), may include the identification information associated with each construct of a plurality of constructs as determined by inspection of the plurality of constructs.

The computing device 330, for example via the data processing and analysis module 355, may use the plurality of identifiers to reconcile/resolve the location data/information determined by the computing device 330 with the location data/information received from a service provider and/or asset owner/operator. Reconciling/resolving the location data of a construct may include determining that the location data/information received from a service provider and/or asset owner/operator for a construct, and the location data/information determined by the computing device 330 for a construct, indicate locations for a construct that satisfy a distance threshold. Based on the distance threshold being satisfied, that location data/information received from the service provider and/or asset owner/operator for a construct and the location data/information determined by the computing device 330 for a construct indicate the same construct. Once the location data of a construct has been reconciled/resolved, the reconciled/resolved location information (e.g., service identifier, facility identifier, etc.) may be stored with and/or assigned to the construct (e.g., data/information indicative of the construct, etc.).

In some instances, reconciling/resolving the location data of a construct may include determining that two locations of constructs indicated by the location data/information received from the service provider and/or asset owner/operator are equidistant from a location of a construct indicated by the location data/information determined by the computing device 330 for a construct. An identifier of the plurality of identifiers for a construct associated with one location of the two locations may be determined and may be stored with and/or assigned to another location of a construct determined by the computing device 330. The identifier of the plurality of identifiers for the remaining location of the two locations may be stored with and/or assigned to the location of the construct determined by the computing device 330.

The computing device 330 may use any method to reconcile/resolve the location data/information determined by the computing device 330 with the location data/information received from a service provider and/or asset owner/operator. The computing device 330 may generate, for each construct of the plurality of constructs, based on the reconciled/resolved location data/information, user interface elements indicative of a construct positioned on the map the location data/information received from the service provider and/or asset owner/operator and a second user interface element indicative of the construct positioned on the map according to the location data/information determined by the computing device 330. As shown at 601, representations, such as icons of a first color, may indicate locations where constructs should exist based on the location data/information received from the service provider and/or asset owner/operator. As shown at 602, representations, such as icons of a second color, may indicate locations where constructs were determined (e.g., based on resolved location data, etc.) and/or observed (e.g., inspected via a UAV 302) to exist (e.g., based on data/information received from a user device 301, etc.).

Anything included with and/or displayed by the user interface screen 600 may be configured by a user. For example, the user interface screen 600 may include interactive elements 603. The interactive elements 603 may be interacted with to configure various markers and/or indicators to be displayed via the map on the user interface screen 600. The user interface screen 600 enables a user to search for specific problematic scenarios affecting constructs of the plurality of constructs (e.g., utility constructs, utility assets, power poles, telephone poles, etc.) by interacting with the interactive elements 604 and configuring the threshold values to be used when one or more filters are applied to the associated datasets. The user interface screen 600 enables the representation of the map to be toggled between a map view and a satellite view for the same datasets.

Figure 6B:
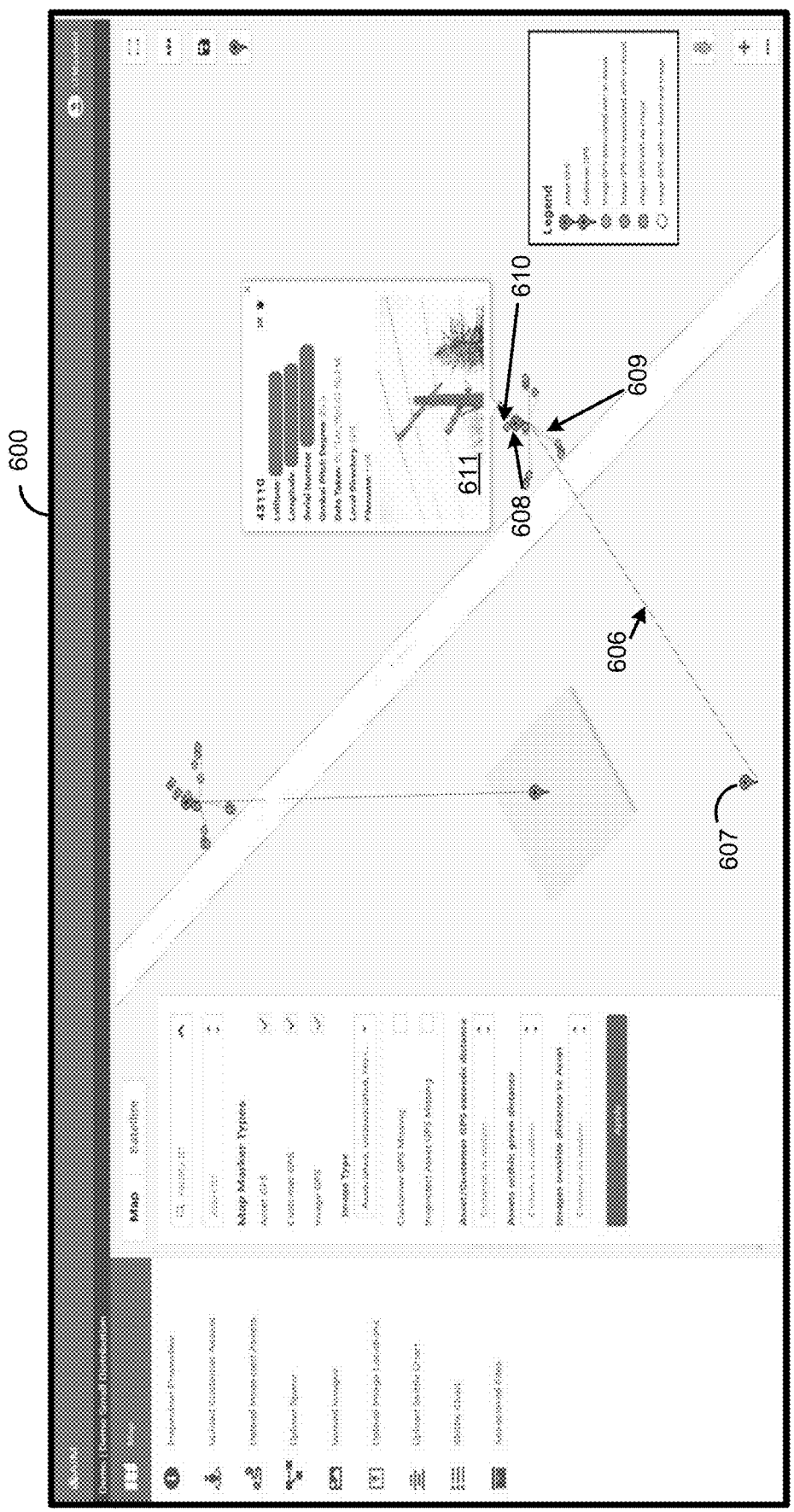
FIG. 6B shows an example user interface for construct identification and analysis.

FIG. 6B shows the user interface screen 600 of, for example, the computing device 330 and/or any other computing device described herein. As shown in FIG. 6B a zoom feature enables a user to zoom in and/or generate a larger image of representations, such as icons of a first color, that indicate locations where constructs should exist based on the location data/information received from the service provider and/or asset owner/operator, and/or representations, such as icons of a second color, that indicate locations where constructs were determined/observed (via a UAV 302) to exist (e.g., based on data/information received from a user device 301, etc.). A dotted line 606 between an icon 607 and an icon 608 may indicate an association that has been established between the associated datasets. The computing device 330, for example via the data processing and analysis module 355, may determine the association between the datasets. For example, the association may be determined based on identifier information (e.g., service identifiers, facility identifiers, etc.) included and/or associated with the datasets. The association may be determined based on any data included and/or associated with the datasets. The association may indicate that, for example, the icon 607 represents the location of an asset/construct provided by the service provider and/or asset owner/operator, whereas the icon 608 indicates the actual location of the asset/construct as determined using the methods/systems described herein. The user interface screen 600 enables a user to update/modify associations between datasets. The datasets may be updated/modified to reflect the updated/modified associations between them.

The user interface screen 600 may include solid lines 609 between circular icons 610 and the icon 608. The circular icons 610 may be representations for images of a construct represented by the icon 608, such as images captured by a UAV 302 and/or received from a user device 301. Interacting with a circular icon, for example clicking the circular icon 610, may cause an image 611 associated with the circular icon to be displayed. The solid lines may represent associations between the images and the construct represented by the icon 607. The association may be determined based on any data included and/or associated with the datasets. The user interface screen 600 enables a user to update/modify associations between datasets. The datasets may be updated/modified to reflect the updated/modified associations between them. Any gaps (e.g., uncorrelated data, etc.) between the location data/information received from the service provider and/or asset owner/operator and the location data/information determined by the computing device 330 may be resolved by manually updating the associated datasets.

Returning to FIG. 3B, the client device 340 (e.g., a smart device, a laptop/computer, etc.) may be used to view, update, and/or modify data/information associated with a plurality of constructs received from a service provider and/or asset owner/operator and/or determined by the user device 301 and/or the computing device 330. The client device 340 may include an interface module 345 that may be used to view, update, and/or modify data/information associated with a plurality of constructs received from a service provider and/or asset owner/operator and/or determined by the user device 301 and/or the computing device 330. The interface module 345 may include one or more interfaces such as a keyboard, a pointing device (e.g., a computer mouse, remote control), an audio device (e.g., a speaker, a microphone, etc.), a camera, a joystick, a scanner, haptic sensing and/or tactile input devices, and/or the like. The interface module 345 may include one or more displays (e.g., Liquid Crystal Display (LCD) displays, Light Emitting Diode (LED) displays, Organic Light-Emitting Diode (OLED) displays, MicroElectroMechanical Systems (MEMS), touchscreen displays, etc.) for displaying/presenting information to a user, such as information associated with a plurality of constructs (e.g., utility constructs, utility assets, power poles, telephone poles, etc.). The one or more displays may display, for example, a variety of contents (e.g., text, image, video, icon, symbol, etc.) to a user.

The interface module 345 may include, be associated with, and/or be in communication with a graphical user interface (GUI), a web browser (e.g., Internet Explorer®, Mozilla Firefox®, Google Chrome®, Safari®, or the like), an application/API. The interface module 345 may request and/or query various files from a local source and/or a remote source, such as user device 301 and/or a computing device 330. The interface module 345 may include a user interface that may request and/or query various files from a local source and/or a remote source, such as user device 301 and/or a computing device 330.

For example, the interface module 345 may be configured with one or more applications and/or the like that facilitate communication between the client device 340 and any component of the system 300 (and/or the system 200). The client device 340 may be configured to communicate determined/identified actionable insights to users/customers based on data/information that is determined and/or communicated within/by the system 300 (and/or the system 200) associated with a plurality of utility constructs varied in type (e.g., poles, spans, substations, etc.), acquired by various methods (e.g., UAV determined image (static/RGB, video, etc.) data, digital pole integrity testing device inspection, manual inspection, sensor (LIDAR, IR, thermal, etc.) detection, and output in various presentation formats (e.g., via a user interface implementing one or more interactive tools/elements, via an application, graphical representations, text, 2D maps, static images, tabular summaries, orthomosaics, 3D virtualizations, panoramas, etc.).

For example, actionable insights may be generated and/or output via a variety of mechanisms, tools, and, methods ancillary to the system 300 (and/or the system 200) and may be integrated, organized, and output via the interface module 345. The system 300 (and/or the system 200) facilitates the integration and analysis of various data types associated with and/or derived from construct identification and/or assessment to be output, for example via the client device 340. For example, the client device 340 may output construct inspection-centric data (e.g., cause display of all data collected during a given construct identification and/or inspection/assessment event, spanning multiple constructs and/or assets) and asset-centric data (e.g., cause display of all the constructs and/or assets for which data exists, spanning multiple identification and/or inspection/assessment events occurring at different times).

Figure 7:
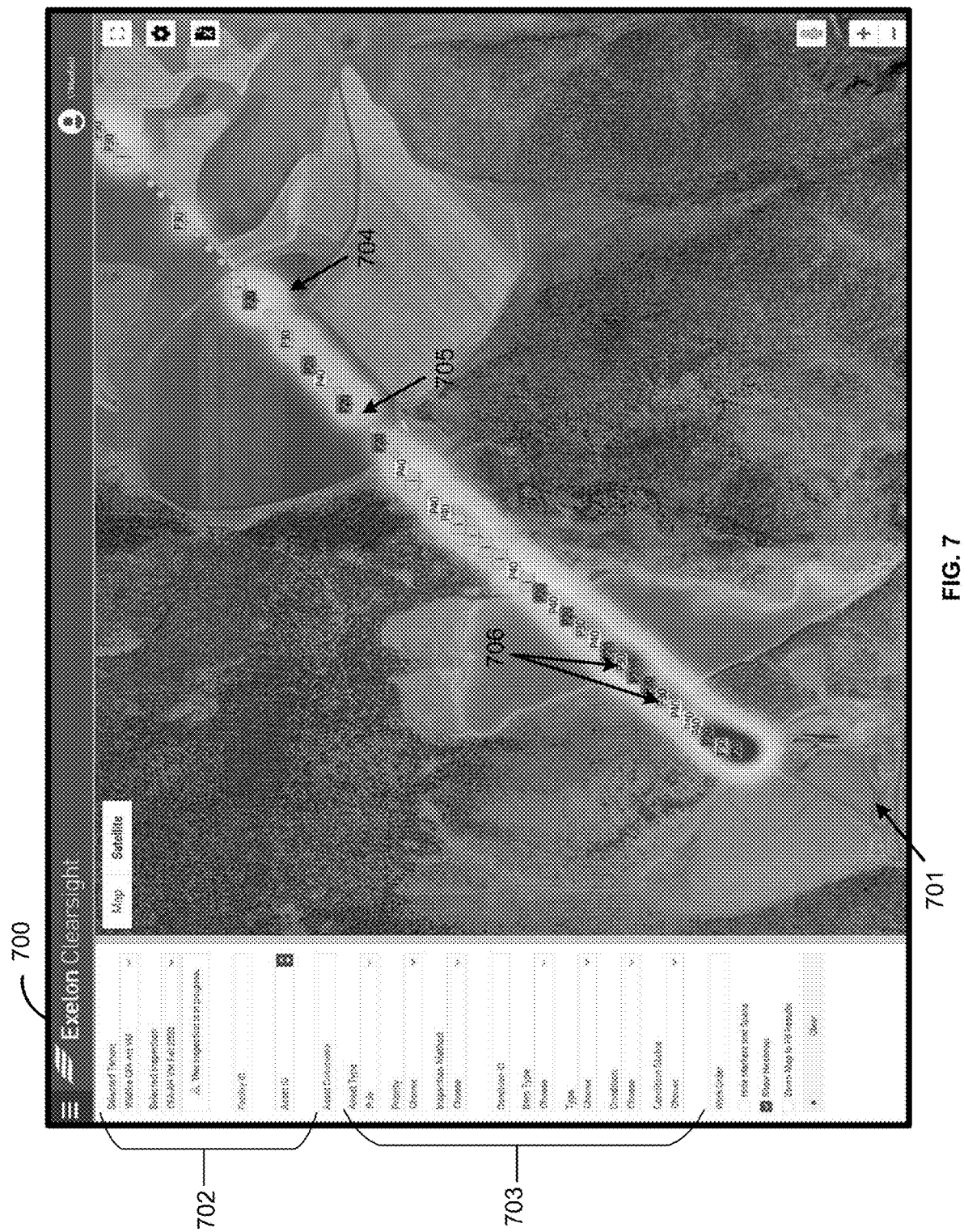
FIG. 7 shows an example user interface for construct identification and analysis.

FIG. 7 shows a user interface screen 700 (for example, of the client device 340 and/or any other computing device and/or component described herein) that may be used for construct identification and analysis. The user interface screen 700 may include a map 701 that details, includes, and/or represents a priority ranking for each construct of a plurality of constructs that has been inspected. A priority ranking may indicate a severity of any adverse condition associated with a construct. The severity may be an indication of how soon conditions associated with a construct should be addressed/resolved, a failure probability associated with an inspected construct, a maintenance requirement for an inspected construct, and/or the like.

The user interface screen 700 enables the representation of the map 701 to be toggled between a map view and a satellite view. The user interface screen 700 enables interactive panoramas from positions along many streets to be accessed that may assist a user in understanding how an area in proximity to a construct appears. The user interface screen 700 may include an interactive element 702, such as a drop-down window, that enables a user to select all available inspections of constructs that as available for review.

Conditions that commonly affect constructs may ranked based on historical data associated with the conditions, such as historical actions required to address a condition and/or similar condition, historical cost data associated with addressing a condition and/or similar condition, and/or the like. Conditions that commonly affect constructs may ranked based on user provided indications of priority. Conditions that commonly affect constructs may ranked according to any method/scheme. The computing device 330 may store and/or access a database that associates types of conditions that commonly affect constructs with associated priority rankings/levels. The database may be updated and/or modified, for example, by a user.

In some instances, priority rankings may be automatically assigned to a construct, for example, by the computing device 330. The machine learning model 354 may be and/or include a trained predictive model. The predictive model may be been trained with one or more labeled datasets to identify adverse conditions affecting a construct and associate the conditions with priority rankings. The trained predictive model may use object recognition and/or the like to determine/identify adverse conditions affecting a construct based on image data/information received from a user device 301.

The user interface screen 700 may include an interactive element 703 that enables filtering of content to be included with the map 701. For example, inspected constructs may be filtered/displayed according to associated priority rankings (e.g., levels of severity, etc.), such as the highest severity condition per construct. Priority rankings may be indicated/represented by any priority markers. For example, priority rankings may be indicated by priority markers, such as P20, P30, P40, which are each associated with a different level of severity of conditions affecting a construct. As shown at 704, heat map shading may be used to depict a total number of conditions associated with constructs. As shown at 706, a priority marker "P30" may indicate a certain priority associated with a level of severity of conditions affecting constructs at the indicated locations. As shown at 705, a circle icon may be used to indicate that no conditions were found to be affecting a construct at the indicated locations. The priority markers and circle icons may be interactive elements. Interacting with a priority marker and/or circle icon, for example, clicking on the priority marker and/or the circle icon, may cause an additional screen of the user interface to open that includes details associated with the construct indicated at the location.

Figure 8:
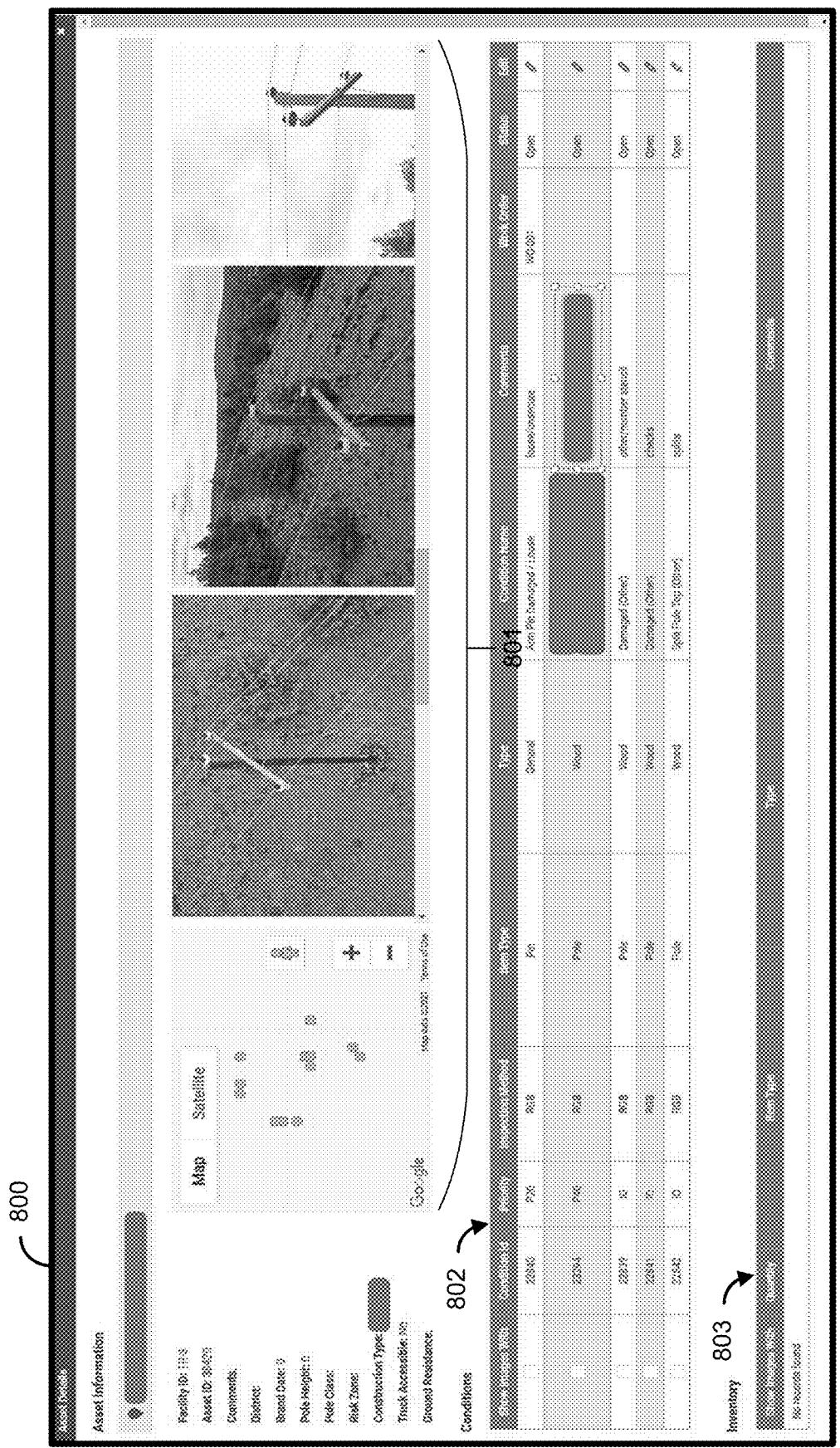
FIG. 8 shows an example user interface for construct identification and analysis.

FIG. 8 shows a user interface screen 800 of the client device 340 (and/or any other computing device and/or component described herein) that may be used for construct identification and analysis. The user interface screen 800 may be generated based on an interaction with a priority marker and/or circle icon, for example, clicking on the priority marker and/or the circle icon of the user interface screen 700. The user interface screen 800 may include details associated with a construct indicated by a priority marker and/or circle icon. For example, the user interface screen 800 may include information such as identification information (e.g., a facility identifier, etc.), locale information (e.g., an associated district, risk zone, etc.), brand date, construct type, dimensions (e.g., pole height, etc.), accessibility details, and/or the like. The user interface screen 800 may a consolidated reference to images, conditions, and/or inventory associated with a construct. As shown at 801, a user may review images associated with a construct. For example, the user may interact with an interactive element, such as a scroll bar, to review images associated with the construct. Interacting with an image, such as by clicking on the image, may cause a high-resolution version of the image to be displayed.

Any conditions associated with the construct may be included, displayed, and/or accessible. As shown in a table 802, conditions associated with the construct may be delineated in an appropriate table. Any components that have been inventoried and/or associated with the construct may be included, displayed, and/or accessible. The table 802, may indicate, for example, data associated with a work order related to the condition of the construct. The table 802, may indicate, for example, work order reference numbers and/or a status of associated work orders. In an embodiment, the data may be presented in a read-only format (e.g., if retrieved from an external system) or may be presented in an updatable format. As shown at 803, components that have been inventoried and/or associated with the construct may be delineated in an appropriate table.

Figure 9:
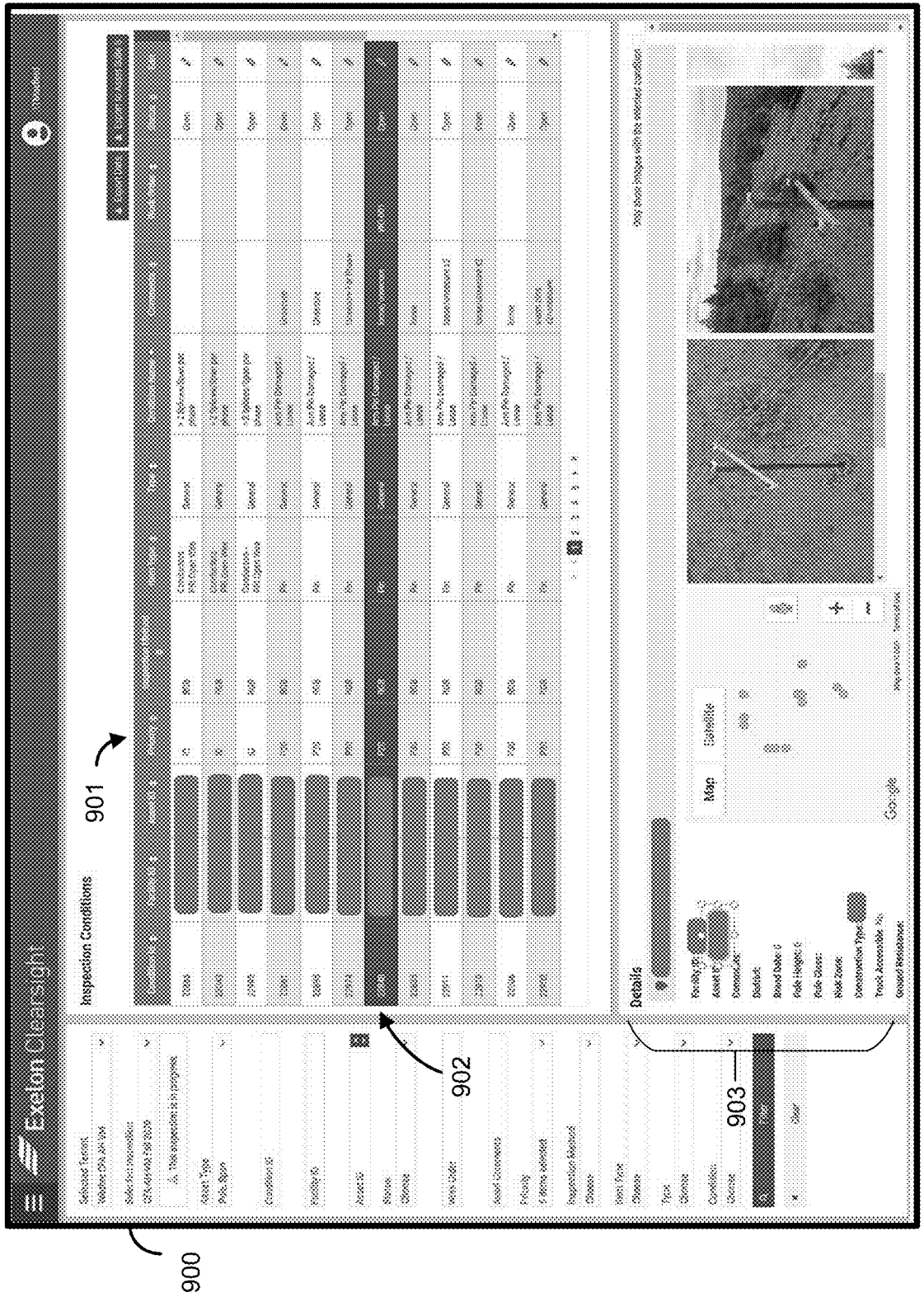
FIG. 9 shows an example user interface for construct identification and analysis.

Returning to FIG. 3B, the client device 340 (e.g., a smart device, a laptop/computer, etc.) may be used to view and/or export data/information associated with one or more inspected constructs (e.g., utility constructs, utility assets, power poles, telephone poles, etc.). FIG. 9 shows a user interface screen 900 of the client device 340 (and/or any other computing device and/or component described herein) that may be used for construct identification and analysis. The user interface screen 900 enables data/information associated with one or more inspected constructs to be to viewed/reviewed and/or exported. The user interface screen 900 may include a table 901 that includes one or more conditions for each of a plurality of constructs. Data of the table 901 may be sorted and/or exported. Interacting with a row of the table 901, for example clicking the row 902, may cause in data and/or images associated with the condition identified by the row to be displayed in a panel 903.

Figure 10:
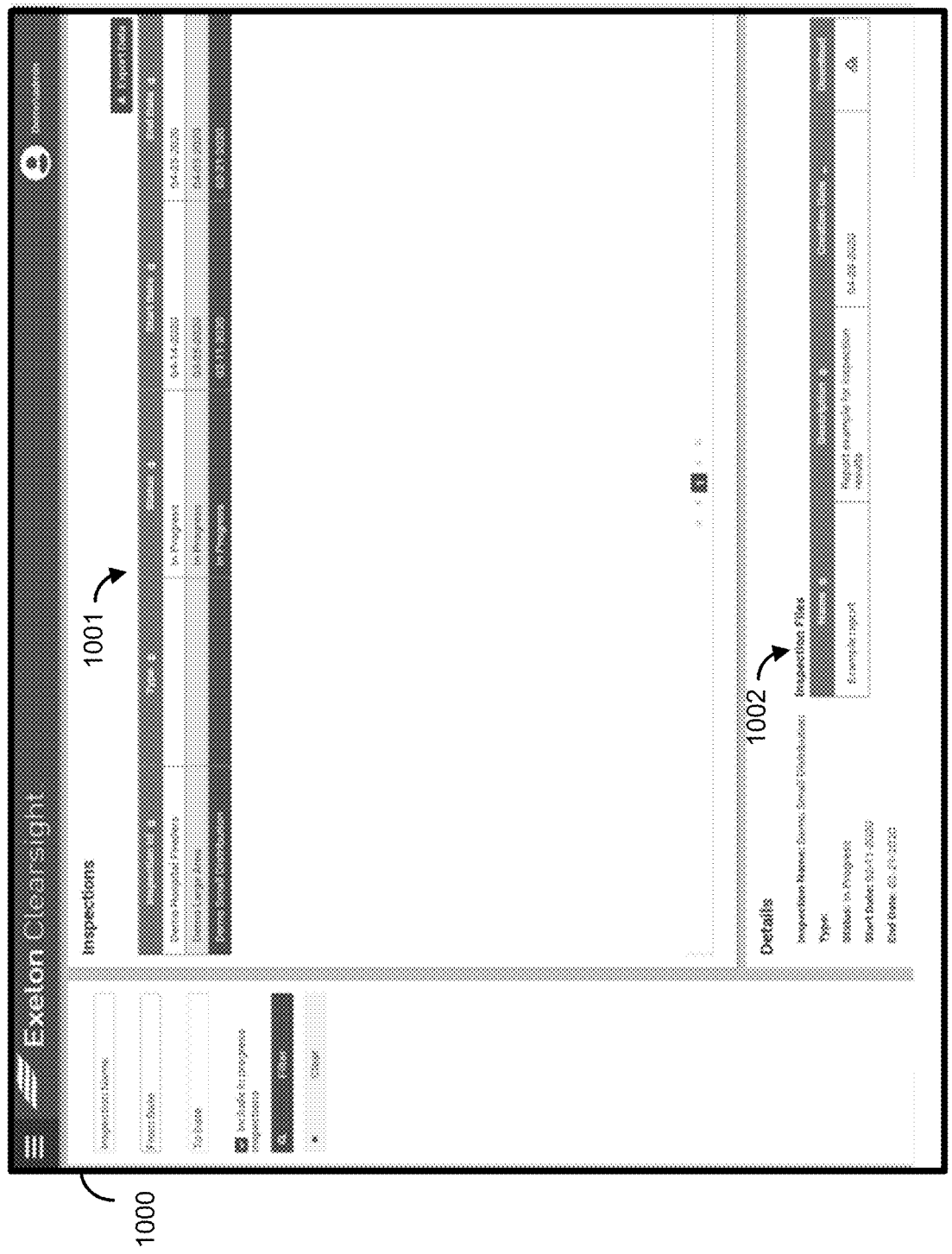
FIG. 10 shows an example user interface for construct identification and analysis.

FIG. 10 shows a user interface screen 1000 of the client device 340 that may be used for construct identification and analysis. The user interface screen 1000 enables a user to view summaries for all inspection records and supporting data/information associated with inspected constructs. As shown at 1001, the user interface screen 1000 may display construct inspections. The user interface screen 1000 may include an interactive element 1002, that when interacted with, enables any supporting documents or reports related to an inspection to be downloaded.

The user interface of the client device 340 and its respective screens (700-1100) may be used to view statistics and high-resolution imagery associated with each construct of a plurality of inspected constructs that are annotated by condition/issue type, priority/severity, and any other associated parameters.

Figure 11:
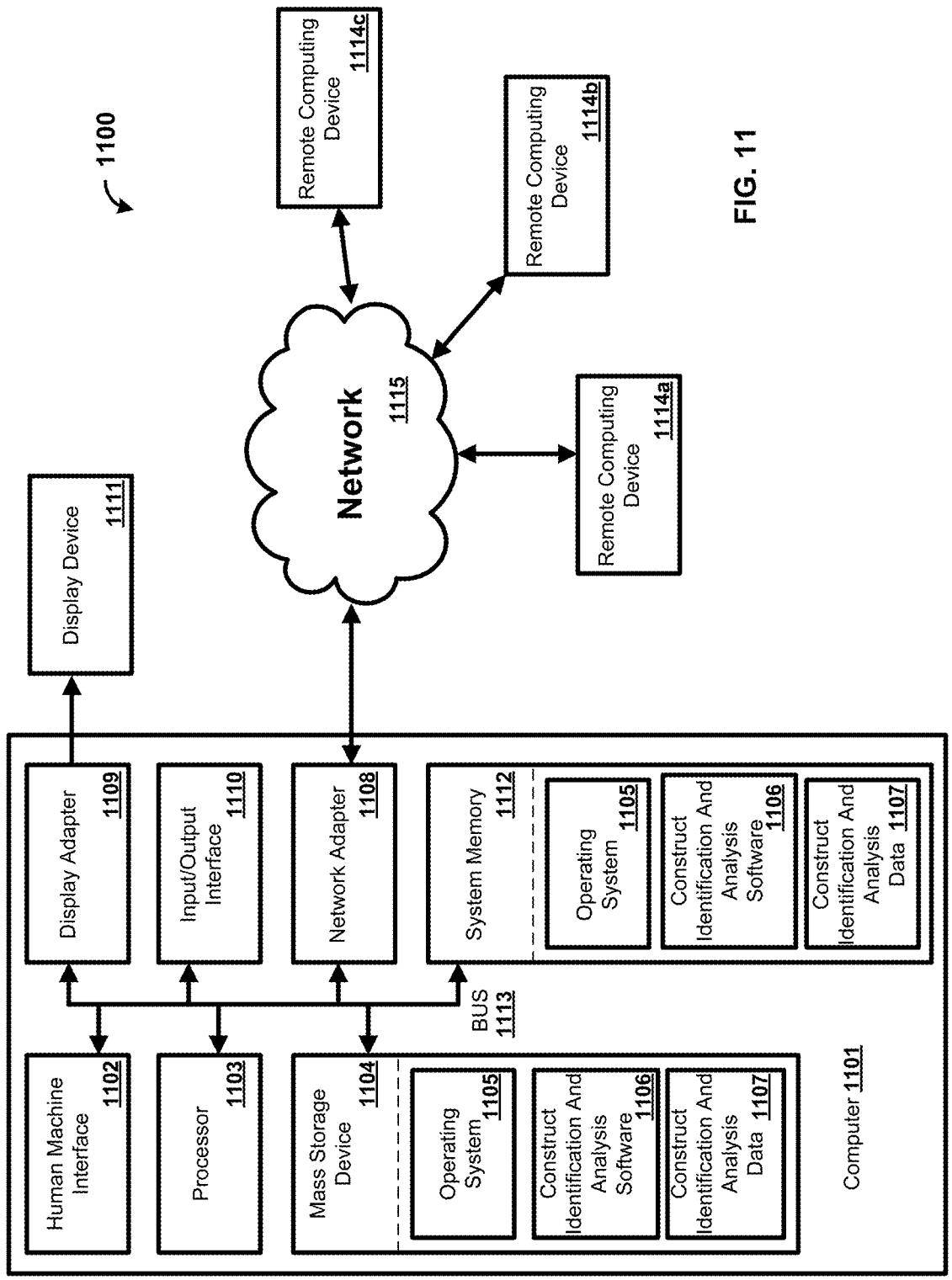
FIG. 11 shows a block diagram of a computing device for implementing construct identification and analysis.

FIG. 11 shows a system 1100 for construct identification and analysis. The user device 201, the user device 301, the computing device 330, the client device 340, and/or any other device/component described herein may be a computer 1101 as shown in FIG. 11.

The computer 1101 may comprise one or more processors 1103, a system memory 1112, and a bus 1113 that couples various components of the computer 1101 including the one or more processors 1103 to the system memory 1112. In the case of multiple processors 1103, the computer 1101 may utilize parallel computing.

The bus 1113 may comprise one or more of several possible types of bus structures, such as a memory bus, memory controller, a peripheral bus, an accelerated graphics port, and a processor or local bus using any of a variety of bus architectures.

The computer 1101 may operate on and/or comprise a variety of computer-readable media (e.g., non-transitory). Computer readable media may be any available media that is accessible by the computer 1101 and comprises, non-transitory, volatile and/or non-volatile media, removable and non-removable media. The system memory 1112 has computer readable media in the form of volatile memory, such as random access memory (RAM), and/or non-volatile memory, such as read only memory (ROM). The system memory 1112 may store data such as construct identification and analysis data 1107 and/or program modules such as operating system 1105 and construct identification and analysis software 1106 that are accessible to and/or are operated on by the one or more processors 1103.

The computer 1101 may also comprise other removable/non-removable, volatile/non-volatile computer storage media. The mass storage device 1104 may provide non-volatile storage of computer code, computer readable instructions, data structures, program modules, and other data for the computer 1101. The mass storage device 1104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1104. An operating system 1105 and construct identification and analysis software 1106 may be stored on the mass storage device 1104. One or more of the operating system 1105 and construct identification and analysis software 1106 (or some combination thereof) may comprise program modules and the construct identification and analysis software 1106. construct identification and analysis data 1107 may also be stored on the mass storage device 1104. Construct identification and analysis data 1107 may be stored in any of one or more databases known in the art. The databases may be centralized or distributed across multiple locations within the network 1115.

A user may enter commands and information into the computer 1101 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1103 via a human machine interface 1102 that is coupled to the bus 1113, but may be connected by other interface and bus structures, such as a parallel port, game port, an IEEE 1394 Port (also known as a Firewire port), a serial port, network adapter 1108, and/or a universal serial bus (USB).

A display device 1111 may also be connected to the bus 1113 via an interface, such as a display adapter 1109. It is contemplated that the computer 1101 may have more than one display adapter 1109 and the computer 1101 may have more than one display device 1111. A display device 1111 may be a monitor, an LCD (Liquid Crystal Display), a light-emitting diode (LED) display, television, smart lens, a smart glass, and/or a projector. In addition to the display device 1111, other output peripheral devices may comprise components such as speakers (not shown) and a printer (not shown) which may be connected to the computer 1101 via Input/Output Interface 1110. Any step and/or result of the methods may be output (or caused to be output) in any form to an output device. Such output may be any form of visual representation, including, but not limited to, textual, graphical, animation, audio, tactile, and the like. The display 1111 and computer 1101 may be part of one device, or separate devices.

The computer 1101 may operate in a networked environment using logical connections to one or more remote computing devices 1114a,b,c. A remote computing device 1114a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1101 and a remote computing device 1114a,b,c may be made via a network 1115, such as a local area network (LAN) and/or a general wide area network (WAN). Such network connections may be through a network adapter 1108. A network adapter 1108 may be implemented in both wired and wireless environments. Such networking environments are conventional and commonplace in dwellings, offices, enterprise-wide computer networks, intranets, and the Internet.

Application programs and other executable program components such as the operating system 1105 are shown herein as discrete blocks, although it is recognized that such programs and components may reside at various times in different storage components of the computing device 1101, and are executed by the one or more processors 1103 of the computer 1101. An implementation of construct identification and analysis software 1106 may be stored on or sent across some form of computer readable media. Any of the disclosed methods may be performed by processor-executable instructions embodied on computer readable media.

FIG. 12 shows a flowchart of a method 1200 for construct identification and analysis. At 1210, first construct data may be received. A computing device (e.g., a cloud server, a smart device, a central device, a data analytics device, the computing device 330, etc.) may receive the first construct data. A service provider and/or asset owner/operator may provide the first construct data. For example, a device associated with the service provider and/or asset owner/operator may send the first construct data to the computing device and/or the first construct data may be uploaded to the computing device. The first construct data may include location information (e.g., dataset, etc.), such as GPS coordinate data and/or the like, associated with a plurality of constructs (e.g., utility constructs, utility assets, power poles, telephone poles, etc.). The location information may be based on data/information uploaded from a public, private, and/or regulatory database, and/or the like. The location information may indicate locations where constructs are assumed to be located. The first construct data may include a plurality of identifiers (e.g., service identifiers, facility identifiers, etc.) associated with each construct of the plurality of constructs.

At 1220, second construct data may be received. The computing device (e.g., a cloud server, a smart device, a central device, a data analytics device, the computing device 330, etc.) may receive the second construct data. The second construct data may include the plurality of identifiers for the plurality of constructs, second location data for the plurality of constructs, and/or status data for the plurality of constructs. In some instances, the second construct data may be based on and/or include digital pole integrity testing device data.

The computing device may receive the second construct data from one or more user devices (e.g., smart devices, data acquisition devices, computing devices, the user device 201, the user device 301, etc.). The one or more user device may compile data/information associated with the plurality of constructs. For example, the one or more user devices may each be in communication with an unmanned aerial vehicle (UAV) (e.g., the UAV 302, etc.) The UAV, or another data gathering system, may perform manual, semi-autonomous, and/or fully autonomous flights/missions, such as data acquisition and inspection flights/missions, to determine, confirm, and/or update data/information associated with the plurality of constructs. The UAV may capture image data/information (e.g., static images, video, etc.) of any/all components of a construct of the plurality of constructs from multiple angles. For example, the UAV may be configured with one or more gimballed cameras/sensors (e.g., high-resolution cameras/sensors, infrared cameras/sensors, ultraviolet cameras/sensors, thermal imaging camera/sensors, LiDAR sensors, etc.) that capture image data/information relating to the construct from multiple angles as the UAV flies to various points around the construct. The image data/information may include date and time information that indicates when images/videos (e.g., aerial images, aerial video, etc.) are captured/taken, as well as GPS coordinates associated with where the images/videos are captured/taken.

A UAV, or another data gathering system, may inspect a construct of the plurality of constructs, identify components present on the construct, the attributes of these components (such as the location of a given component relative to another), and determine/identify any adverse conditions that could affect the performance, integrity, and/or resiliency of the construct. For example, the UAV may capture image data/information that may be analyzed to identify any adverse conditions such as such as wood rot, arc damage, flashing, tracking, floating conductors, loose tie-wires, loose hardware, and/or the like. The adverse conditions may be determined/identified via manual inspection of the image data/information and/or via machine learning, computer vision, and/or the like. The status data for the plurality of constructs may include one or more images associated with each construct of the plurality of constructs and a location of each of the one or more images. The status data may include one or more indications of conditions, such as adverse conditions, affecting one or more constructs of the plurality of constructs.

The second location data for the plurality of constructs may include locations for each construct of the plurality of constructs determined from the status data according to any method described herein. For example, the status data may be used to determine, for each construct of the plurality of constructs, a respective plurality of images. Based on coordinates associated with each image of the respective plurality of images, a respective group of coordinates may be determined. Then, based on each respective group of coordinates, coordinates of a centroid may be determined. The coordinates of the centroid for each respective group of coordinates may be assigned as and/or determined to be a location (e.g., location coordinates, etc.) for the respective construct.

At 1230, a map of the plurality of constructs may be generated. The computing device may generate the map. The map may be displayed via a user interface associated with the computing device. The map may be generated based on the first construct data and the second construct data. The map may include, for each construct of the plurality of constructs, based on the status data, one or more status interface elements indicative of an image of the construct positioned based on the location of the image relative to a user interface element indicative of the construct positioned on the map according to the second location data.

Generating the map may include resolving, based on the plurality of identifiers, the first location data and the second location data for each construct of the plurality of constructs. Resolving the first location data and the second location data for each construct of the plurality of constructs may include determining which assets/constructs (e.g., utility poles) actually exist and what the actual location is for each asset/construct in the second construct data. A data record indicative of an asset/construct so determined may be created. One or more images collected of the asset/construct may be associated with the data record. An association (or link) between the data record created by the methods and systems disclosed using the second construct data and an asset/construct data record in the first construct data may be created. Such an association permits reconciliation with the asset/construct data records of the service provider and/or asset owner/operator with reality. A resulting map may indicate the position of the asset determined from the second construct data and the position of the asset determined from the first construct data, visually representing a discrepancy, if any, between the determined location (second construct data) and the presumed location (first construct data).

In some instances, resolving the first location data and the second location data for each construct of the plurality of constructs may include determining that the first location data for a first construct of the plurality of constructs and the second location data for a second construct of the plurality of constructs satisfy a distance threshold. For example, the location data for the first construct may indicate that the first construct is within proximity to a location indicated by the location data for the second construct. The first construct and the second construct may be determined to be the same construct based on the distance threshold being satisfied. An identifier of the plurality of identifiers for the first construct may be assigned to the second location data for the second construct based on the determination that the first construct and the second construct are the same construct.

In some instances, resolving the first location data and the second location data for each construct of the plurality of constructs may include determining that two locations of constructs indicated by the first location data are equidistant from a location of a construct indicated by the second location data. For example, the second location data may indicate, based on associated coordinates, that a construct is at location "X." The first location data may indicate, based on associated coordinates, that a construct is at a location that is two meters to the right of the location "X," and that another construct is at another location that is two meters to the left of the location "X." An identifier of the plurality of identifiers for a construct associated with one location of the two locations may be determined to be assigned to another location of a construct from the second location data. The identifier of the plurality of identifiers for the remaining location of the two locations may then be assigned to the location of the construct from the second location data.

In some instances, resolving the first location data and the second location data for each construct of the plurality of constructs may include determining that two locations of constructs indicated by the first location data are equidistant from a location of a construct indicated by the second location data. For example, the second location data may indicate, based on associated coordinates, that a construct is at location "X." The first location data may indicate, based on associated coordinates, that a construct is at a one location that is two meters to the right of the location "X," and that another construct is at another location that is two meters to the left of the location "X." An identifier of the plurality of identifiers for a construct associated with one location of the two locations may be determined to be assigned to another location of a construct from the second location data. A notification may be generated and/or sent via a user interface of and/or associated with the computing device. The notification may indicate that the identifier of the plurality of identifiers for the construct associated with one location of the two locations is assigned to the another location of the construct from the second location data. Based on the notification, an assignment of the identifier of the plurality of identifiers for the remaining location of the two locations to the location of the construct from the second location data may be received. The assignment may be received based on a user interacting with an interactive element of the user interface. For example, the assignment of the identifier of the plurality of identifiers for the remaining location of the two locations to the location of the construct from the second location data may be a manual assignment by the user.

The map may include user interface element indicative of constructs of the plurality of constructs. For example, based on the resolved first location data and the second location data, a first user interface element indicative of the construct positioned on the map according to the first location data and a second user interface element indicative of the construct positioned on the map according to the second location data may be generated for each construct of the plurality of constructs. An image associated with the one or more status interface elements may be displayed. For example, the computing device may cause, based on an interaction with the one or more status interface elements, an image associated with the one or more status interface elements may be displayed. In some instances, based on an interaction with the one or more status interface elements, an inventory of equipment associated with a construct may be displayed, one or more indications of conditions affecting the construct may be displayed, and/or any data/information associated with a construct may be displayed.

The map may include a priority ranking associated with one or more constructs of the plurality of constructs. The priority rankings may be based on the status data. For example, conditions that commonly affect constructs may ranked based on historical data associated with the conditions, such as historical actions required to address a condition and/or similar condition, historical cost data associated with addressing a condition and/or similar condition, and/or the like. Conditions that commonly affect constructs may ranked based on user provided indications of priority. Conditions that commonly affect constructs may be ranked according to any method/scheme. The computing device may store and/or access a database that associates types of conditions that commonly affect constructs with associated priority rankings/levels. The database may be updated and/or modified, for example, by a user. The database may be may be accessed/used to assign priority rankings to the plurality of constructs. Priority rankings may be manually assigned to a constructs via the user interface screen, for example, based on manual observation/inspection of images associated with a construct included with the status data.

In some instances, priority rankings may be automatically assigned to a construct, for example, by the computing device. The computing device may be configured with a machine learning model. The machine learning model may be and/or include a trained predictive model. The predictive model may be been trained with one or more labeled datasets to identify components present on the construct and/or adverse conditions affecting a construct and associate the conditions with priority rankings. The trained predictive model may use object recognition and/or the like to determine/identify adverse conditions affecting a construct of the plurality of constructs based on an image or images included with the status data.

FIG. 13 shows a flowchart of a method 1300 for construct identification and analysis. At 1310, first construct data may be received. A computing device (e.g., a cloud server, a smart device, a central device, a data analytics device, the computing device 330, etc.) may receive the first construct data. A service provider and/or asset owner/operator may provide the first location data. For example, a device associated with the service provider and/or asset owner/operator may send the first construct data to the computing device and/or the first construct data may be uploaded to the computing device. The first construct data may include location information (e.g., dataset, etc.), such as GPS coordinate data and/or the like, associated with a plurality of constructs (e.g., utility constructs, utility assets, power poles, telephone poles, etc.). The location information may be based on data/information uploaded from a public, private, and/or regulatory database, and/or the like. The location information may indicate locations where constructs are assumed to be located. The first construct data may include a plurality of identifiers (e.g., service identifiers, facility identifiers, etc.) associated with each construct of the plurality of constructs.

At 1320, second construct data may be received. The computing device (e.g., a cloud server, a smart device, a central device, a data analytics device, the computing device 330, etc.) may receive the second construct data. The second construct data may include the plurality of identifiers for the plurality of constructs, second location data for the plurality of constructs, and status data for the plurality of constructs. In some instances, the second construct data may be based on and/or include digital pole integrity testing device data.

The computing device may receive the second construct data from one or more user devices (e.g., smart devices, data acquisition devices, computing devices, the user device 201, the user device 301, etc.). The one or more user device may compile data/information associated with the plurality of constructs. For example, the one or more user devices may each be in communication with an unmanned aerial vehicle (UAV) (e.g., the UAV 302, etc.) The UAV may perform manual, semi-autonomous, and/or fully autonomous flights/missions, such as data acquisition and inspection flights/missions, to determine, confirm, and/or update data/information associated with the plurality of constructs. The UAV may capture image data/information (e.g., static images, video, etc.) of any/all components of a construct of the plurality of constructs from multiple angles. For example, the UAV may be configured with one or more gimballed cameras/sensors (e.g., high-resolution cameras/sensors, infrared cameras/sensors, ultraviolet cameras/sensors, thermal imaging camera/sensors, LiDAR sensors, etc.) that capture image data/information relating to the construct from multiple angles as the UAV flies around the construct. The image data/information may include date and time information that indicates when images/videos (e.g., aerial images, aerial video, etc.) are captured/taken, as well as GPS coordinates associated with where the images/videos are captured/taken.

A UAV, or another data gathering system, may inspect a construct of the plurality of constructs, identify components present on the construct, the attributes of these components (such as the location of a given component relative to another), and determine/identify any adverse conditions that could affect the performance, integrity, and/or resiliency of the construct. For example, the UAV may capture image data/information that may be analyzed to identify any adverse conditions such as such as wood rot, arc damage, flashing, tracking, floating conductors, loose tie-wires, loose hardware, and/or the like. The adverse conditions may be determined/identified via manual inspection of the image data/information and/or via machine learning, computer vision, and/or the like. The status data for the plurality of constructs may include one or more images associated with each construct of the plurality of constructs and a location of each of the one or more images. The status data may include one or more indications of conditions, such as adverse conditions, affecting one or more constructs of the plurality of constructs.

The second location data for the plurality of constructs may include locations for each construct of the plurality of constructs determined from the status data. Locations for each construct may be determined using any method disclosed herein. For example, the status data may be used to determine, for each construct of the plurality of constructs, a respective plurality of images. Based on coordinates associated with each image of the respective plurality of images, a respective group of coordinates may be determined. Then, based on each respective group of coordinates, coordinates of a centroid may be determined. The coordinates of the centroid for each respective group of coordinates may be assigned as and/or determined to be a location (e.g., location coordinates, etc.) for the respective construct.

At 1330, an identifier of the plurality of identifiers for a construct associated with one location of two locations may be determined to be assigned to another location of a construct from the second location data. The computing device may determine, based on two locations of constructs indicated by the first location data being equidistant from a location of a construct indicated by the second location data, that an identifier of the plurality of identifiers for a construct associated with one location of the two locations is assigned to another location of a construct from the second location data. For example, the second location data may indicate, based on associated coordinates, that a construct is at location "X." The first location data may indicate, based on associated coordinates, that a construct is at a one location that is two meters to the right of the location "X," and that another construct is at another location that is two meters to the left of the location "X." An identifier of the plurality of identifiers for a construct associated with one location of the two locations may be determined to be assigned to another location of a construct from the second location data.

At 1340, the identifier of the plurality of identifiers for the remaining location of the two locations may be assigned to the location of the construct from the second location data. The computing device may assign the identifier of the plurality of identifiers for the remaining location of the two locations to the location of the construct from the second location data.

In some instances, a notification may be generated and/or sent via a user interface of and/or associated with the computing device. The notification may indicate that the identifier of the plurality of identifiers for the construct associated with one location of the two locations is assigned to the another location of the construct from the second location data. Based on the notification, an assignment of the identifier of the plurality of identifiers for the remaining location of the two locations to the location of the construct from the second location data may be received. The assignment may be received based on a user interacting with an interactive element of the user interface. For example, the assignment of the identifier of the plurality of identifiers for the remaining location of the two locations to the location of the construct from the second location data may be a manual assignment by the user.

FIG. 14 shows a flowchart of a method 1400 for construct identification and analysis. At 1410, first construct data may be received. A computing device (e.g., a cloud server, a smart device, a central device, a data analytics device, the computing device 330, etc.) may receive the first construct data. A service provider and/or asset owner/operator may provide the first location data. For example, a device associated with the service provider and/or asset owner/operator may send the first construct data to the computing device and/or the first construct data may be uploaded to the computing device. The first construct data may include location information (e.g., dataset, etc.), such as GPS coordinate data and/or the like, associated with a plurality of constructs (e.g., utility constructs, utility assets, power poles, telephone poles, etc.). The location information may be based on data/information uploaded from a public, private, and/or regulatory database, and/or the like. The location information may indicate locations where constructs are assumed to be located. The first construct data may include a plurality of identifiers (e.g., service identifiers, facility identifiers, etc.) associated with each construct of the plurality of constructs.

At 1420, second construct data may be received. The computing device (e.g., a cloud server, a smart device, a central device, a data analytics device, the computing device 330, etc.) may receive the second construct data. The second construct data may include the plurality of identifiers for the plurality of constructs, second location data for the plurality of constructs, and status data for the plurality of constructs. In some instances, the second construct data may be based on and/or include digital pole integrity testing device data.

The computing device may receive the second construct data from one or more user devices (e.g., smart devices, data acquisition devices, computing devices, the user device 201, the user device 301, etc.). The one or more user device may compile data/information associated with the plurality of constructs. For example, the one or more user devices may each be in communication with an unmanned aerial vehicle (UAV) (e.g., the UAV 302, etc.) The UAV may perform manual, semi-autonomous, and/or fully autonomous flights/missions, such as data acquisition and inspection flights/missions, to determine, confirm, and/or update data/information associated with the plurality of constructs. The UAV may capture image data/information (e.g., static images, video, etc.) of any/all components of a construct of the plurality of constructs from multiple angles. For example, the UAV may be configured with one or more gimballed cameras/sensors (e.g., high-resolution cameras/sensors, infrared cameras/sensors, ultraviolet cameras/sensors, thermal imaging camera/sensors, LiDAR sensors, etc.) that capture image data/information relating to the construct from multiple angles as the UAV flies to various points around the construct. The image data/information may include date and time information that indicates when images/videos (e.g., aerial images, aerial video, etc.) are captured/taken, as well as GPS coordinates associated with where the images/videos are captured/taken.

A UAV, or another data gathering system, may inspect a construct of the plurality of constructs, identify components present on the construct, the attributes of these components (such as the location of a given component relative to another), and determine/identify any conditions that could affect the performance, integrity, and/or resiliency of the construct. For example, the UAV may capture image data/information that may be analyzed to identify any adverse conditions such as such as wood rot, arc damage, flashing, tracking, floating conductors, loose tie-wires, loose hardware, and/or the like. The adverse conditions may be determined/identified via manual inspection of the image data/information and/or via machine learning, computer vision, and/or the like. The status data for the plurality of constructs may include one or more images associated with each construct of the plurality of constructs and a location of each of the one or more images. The status data may include one or more indications of conditions, such as adverse conditions, affecting one or more constructs of the plurality of constructs.

The second location data for the plurality of constructs may include locations for each construct of the plurality of constructs determined from the status data. The locations for each construct of the plurality of constructs may be determined using any method disclosed herein. For example, the status data may be used to determine, for each construct of the plurality of constructs, a respective plurality of images. Based on coordinates associated with each image of the respective plurality of images, a respective group of coordinates may be determined. Then, based on each respective group of coordinates, coordinates of a centroid may be determined. The coordinates of the centroid for each respective group of coordinates may be assigned as and/or determined to be a location (e.g., location coordinates, etc.) for the respective construct.

At 1430, an identifier of the plurality of identifiers for a construct associated with one location of two locations may be determined to be assigned to another location of a construct from the second location data. The computing device may determine, based on two locations of constructs indicated by the first location data being equidistant from a location of a construct indicated by the second location data, that an identifier of the plurality of identifiers for a construct associated with one location of the two locations is assigned to another location of a construct from the second location data. For example, the second location data may indicate, based on associated coordinates, that a construct is at location "X." The first location data may indicate, based on associated coordinates, that a construct is at a one location that is two meters to the right of the location "X," and that another construct is at another location that is two meters to the left of the location "X." An identifier of the plurality of identifiers for a construct associated with one location of the two locations may be determined to be assigned to another location of a construct from the second location data.

At 1440, the identifier of the plurality of identifiers for the remaining location of the two locations may be assigned to the location of the construct from the second location data.

For example, a notification may be generated and/or sent via a user interface of and/or associated with the computing device. The notification may indicate that the identifier of the plurality of identifiers for the construct associated with one location of the two locations is assigned to the another location of the construct from the second location data. Based on the notification, an assignment of the identifier of the plurality of identifiers for the remaining location of the two locations to the location of the construct from the second location data may be received. The assignment may be received based on a user interacting with an interactive element of the user interface. For example, the assignment of the identifier of the plurality of identifiers for the remaining location of the two locations to the location of the construct from the second location data may be a manual assignment by the user. In some instances, the computing device may automatically assign the identifier of the plurality of identifiers for the remaining location of the two locations to the location of the construct from the second location data.

FIG. 15 shows a flowchart of a method 1500 for construct identification and analysis. At 1510, receiving first construct data, wherein the first construct data comprises a plurality of identifiers for a plurality of constructs and first location data for the plurality of constructs. Receiving the first construct data may include receiving the first construct data from a client device, a third-party, a service entity, and/or the like.

At 1520, receiving second construct data, wherein the second construct data comprises the plurality of identifiers for the plurality of constructs, second location data for the plurality of constructs, and one or more images associated with each construct of the plurality of constructs. Each image of the one or more images associated with each construct of the plurality of constructs may be associated with coordinates and/or a capture angle. Receiving the second construct data may include receiving the second construct data from a UAV, a digital pole integrity testing device, manual inspection, user indication, one or more sensors, and/or the like.

At 1530, resolving for one or more constructs of the plurality of constructs, based on the plurality of identifiers, the first location data and the second location data. Resolving the first location data and the second location data for the one or more constructs may include: determining that the first location data for a first construct of the plurality of constructs and the second location data for a second construct of the plurality of constructs satisfy a distance threshold; determining, based on the distance threshold being satisfied, that the first construct and the second construct are the same construct; and assigning an identifier of the plurality of identifiers for the first construct to the second location data for the second construct.

Resolving the first location data and the second location data for the one or more constructs may include: determining that two locations of constructs indicated by the first location data are equidistant from a location of a construct indicated by the second location data; determining that an identifier of the plurality of identifiers for a construct associated with one location of the two locations is assigned to another location of a construct from the second location data; assigning the identifier of the plurality of identifiers for the remaining location of the two locations to the location of the construct from the second location data.

Resolving the first location data and the second location data for the one or more constructs may include: determining that two locations of constructs indicated by the first location data are equidistant from a location of a construct indicated by the second location data; determining that an identifier of the plurality of identifiers for a construct associated with one location of the two locations is assigned to another location of a construct from the second location data; sending a notification indicating that the identifier of the plurality of identifiers for the construct associated with one location of the two locations is assigned to the another location of the construct from the second location data; and receiving, based on the notification, an assignment of the identifier of the plurality of identifiers for the remaining location of the two locations to the location of the construct from the second location data.

Resolving the first location data and the second location data for the one or more constructs may include: receiving, based on two or more locations of constructs indicated by the first location data and respective distance relationships with a location of a construct indicated by the second location data, an indication that an identifier of the plurality of identifiers for a construct associated with a location of the two or more locations is assigned to another location of a construct from the second location data; and receiving an assignment of an identifier of the plurality of identifiers for a remaining location of the two or more locations to the location of the construct from the second location data.

In some instances, each image of the one or more images associated with each construct of the plurality of constructs may be associated with coordinates, for example, based on direct/user assignment of coordinates. For example, the method 1500 may include associating, based on interaction with an interactive element of a user interface, the coordinates for at least one construct of the plurality of constructs with the at least one construct.

In some instances, the first construct data may be associated with a first data structure and the second construct data may be associated with a second data structure, the method 1500 may include associating, based on a data template and/or the like, the first data structure with the second data structure. For example, resolving the first location data and the second location data may be further based on the first data structure being associated with the second data structure.

At 1540, determining, for each construct of the one or more constructs, based on the one or more images associated with the construct, status data. The status data may indicate one or more conditions affecting the construct. Determining the status data may include: causing display of the one or more images associated with each construct of the one or more constructs; and receiving, based on the display of the one or more images associated with each construct of the one or more constructs, an assignment of the one or more conditions affecting the one or more constructs.

Determining the status data may include: determining, for each construct of the one or more constructs, based on one or more objects within the one or more images associated with the construct, the one or more conditions affecting the one or more constructs; and storing, for each construct of the one or more constructs, an indication of the one or more conditions affecting the one or more constructs. Determining the status data may also include: identifying components present on the construct and the attributes of these components (such as the location of a given component relative to another), At 1550, generating a user interface comprising interactive elements that indicate the one or more constructs, the one or more images associated with the one or more constructs, and the status data.

The method 1500 may also include assigning, for each construct of the one or more constructs, based on the one or more conditions affecting the construct, a priority to the status data for the construct. The method 1500 may also include receiving priority data; assigning, for each construct of the one or more constructs, based on the priority data and the one or more conditions affecting the construct, a priority to the status data for the construct.

The method 1500 may also include determining, for each construct of the plurality of constructs, an image of the one or more images associated with the construct that comprises a top view of the construct; receiving a confirmation of the image that comprises the top view of the construct; and assigning, the coordinates associated with the image as a location for the construct, wherein the second location data comprises the assigned location for each construct of the plurality of constructs. In an embodiment, one or more machine learning systems (e.g., computer vision) as described herein may be used to determine that image of the one or more images associated with the construct comprises a top view of the construct.

The method 1500 may also include determining, for each construct of the plurality of constructs, an image of the one or more images associated with the construct that is associated with a capture angle that matches a predefined angle; and assigning, the coordinates associated with the image as a location for the construct, wherein the second location data comprises the assigned location for each construct of the plurality of constructs.

Method 1500 may also include determining, for each construct of the plurality of constructs, based the coordinates associated with each image of the one or more images associated with the construct, a group of coordinates; determining, based on the group of coordinates, coordinates of a centroid; and assigning, the coordinates of the centroid as a location for the construct, wherein the second location data comprises the assigned location for each construct of the plurality of constructs.

Method 1500 may also include sending, based on the status data for at least one construct of the one or more constructs, a request to one or more of a third-party service device and a work management system. One or more of the third-party service device and the work management system may be configured to facilitate, based on the one or more conditions affecting the at least one construct, one or more of a repair to the at least one construct, a modification to the at least one construct, and an update to the at least one construct.

FIG. 16 shows a flowchart of a method 1600 for construct identification and analysis. At 1610, receiving, from a client device, first construct data, wherein the first construct data comprises a plurality of identifiers for a plurality of constructs and first location data for the plurality of constructs. Receiving the first construct data may include receiving the first construct data from a client device, a third-party, a service entity, and/or the like.

At 1620, receiving second construct data, wherein the second construct data comprises the plurality of identifiers for the plurality of constructs, second location data for the plurality of constructs, and one or more images associated with each construct of the plurality of constructs. Each image of the one or more images associated with each construct of the plurality of constructs may be associated with coordinates and/or a capture angle. Receiving the second construct data may include receiving the second construct data from a UAV, a digital pole integrity testing device, manual inspection, one or more sensors, and/or the like.

At 1630, resolving for one or more constructs of the plurality of constructs, based on the plurality of identifiers, the first location data and the second location data. Resolving the first location data and the second location data for the one or more constructs may include: determining that the first location data for a first construct of the plurality of constructs and the second location data for a second construct of the plurality of constructs satisfy a distance threshold; determining, based on the distance threshold being satisfied, that the first construct and the second construct are the same construct; and assigning an identifier of the plurality of identifiers for the first construct to the second location data for the second construct.

Resolving the first location data and the second location data for the one or more constructs may include: determining that two locations of constructs indicated by the first location data are equidistant from a location of a construct indicated by the second location data; determining that an identifier of the plurality of identifiers for a construct associated with one location of the two locations is assigned to another location of a construct from the second location data; and assigning the identifier of the plurality of identifiers for the remaining location of the two locations to the location of the construct from the second location data.

Resolving the first location data and the second location data for the one or more constructs may include: determining that two locations of constructs indicated by the first location data are equidistant from a location of a construct indicated by the second location data; determining that an identifier of the plurality of identifiers for a construct associated with one location of the two locations is assigned to another location of a construct from the second location data; sending a notification indicating that the identifier of the plurality of identifiers for the construct associated with one location of the two locations is assigned to the another location of the construct from the second location data; and receiving, based on the notification, an assignment of the identifier of the plurality of identifiers for the remaining location of the two locations to the location of the construct from the second location data.

Resolving the first location data and the second location data for the one or more constructs may include: receiving, based on two or more locations of constructs indicated by the first location data and respective distance relationships with a location of a construct indicated by the second location data, an indication that an identifier of the plurality of identifiers for a construct associated with a location of the two or more locations is assigned to another location of a construct from the second location data; and receiving an assignment of an identifier of the plurality of identifiers for a remaining location of the two or more locations to the location of the construct from the second location data.

At 1640, receiving, for each construct of the one or more constructs, based on the one or more images associated with the construct, status data. The status data may indicate components present on the construct and the attributes of these components (such as the location of a given component relative to another). The status data may indicate one or more conditions affecting one or more components of the construct.

At 1650, sending, to the client device, data indicative of the one or more constructs, the one or more images associated with the one or more constructs, and the status data.

Method 1600 may also include causing the client device to display one or more of: the data indicative of the one or more constructs, the one or more images associated with the one or more constructs, or the status data.

FIG. 17 shows a flowchart of a method 1700 for construct identification and analysis. At 1710, receiving, from a client device, first construct data, wherein the first construct data comprises a plurality of identifiers for a plurality of constructs and first location data for the plurality of constructs. Receiving the first construct data may include receiving the first construct data from a client device, a third-party, a service entity, and/or the like.

At 1720, receiving second construct data, wherein the second construct data comprises the plurality of identifiers for the plurality of constructs, second location data for the plurality of constructs, and one or more images associated with each construct of the plurality of constructs. Each image of the one or more images associated with each construct of the plurality of constructs may be associated with coordinates and/or a capture angle. Receiving the second construct data may include receiving the second construct data from a UAV, a digital pole integrity testing device, manual inspection, one or more sensors, and/or the like.

At 1730, resolving for one or more constructs of the plurality of constructs, based on the plurality of identifiers, the first location data, and the second location data. Resolving the first location data and the second location data for the one or more constructs may include: determining that the first location data for a first construct of the plurality of constructs and the second location data for a second construct of the plurality of constructs satisfy a distance threshold; determining, based on the distance threshold being satisfied, that the first construct and the second construct are the same construct; and assigning an identifier of the plurality of identifiers for the first construct to the second location data for the second construct.

Resolving the first location data and the second location data for the one or more constructs may include: determining that two locations of constructs indicated by the first location data are equidistant from a location of a construct indicated by the second location data; determining that an identifier of the plurality of identifiers for a construct associated with one location of the two locations is assigned to another location of a construct from the second location data; and assigning the identifier of the plurality of identifiers for the remaining location of the two locations to the location of the construct from the second location data.

Resolving the first location data and the second location data for the one or more constructs may include: determining that two locations of constructs indicated by the first location data are equidistant from a location of a construct indicated by the second location data; determining that an identifier of the plurality of identifiers for a construct associated with one location of the two locations is assigned to another location of a construct from the second location data; sending a notification indicating that the identifier of the plurality of identifiers for the construct associated with one location of the two locations is assigned to the another location of the construct from the second location data; and receiving, based on the notification, an assignment of the identifier of the plurality of identifiers for the remaining location of the two locations to the location of the construct from the second location data.

Resolving the first location data and the second location data for the one or more constructs may include: receiving, based on two or more locations of constructs indicated by the first location data and respective distance relationships with a location of a construct indicated by the second location data, an indication that an identifier of the plurality of identifiers for a construct associated with a location of the two or more locations is assigned to another location of a construct from the second location data; and receiving an assignment of an identifier of the plurality of identifiers for a remaining location of the two or more locations to the location of the construct from the second location data.

At 1740, determining, for each construct of the one or more constructs, based on the one or more images associated with the construct, one or more conditions affecting the construct. May also determine components present on the construct and the attributes of these components (such as the location of a given component relative to another).

At 1730, assigning, to each construct of the one or more constructs, based on the one or more conditions affecting the construct, a priority. In an embodiment, assigning a priority to a construct may comprise assigning a priority to a condition associated with the construct. In an embodiment, assigning a priority to a construct may comprise determining a function (e.g., a sum, an average, and the like) of one or more priorities assigned to one or more conditions associated with the construct. In an embodiment, a construct may be assigned a priority and a condition associated with the construct may be assigned a priority.

The method 1700 may also include generating a map. The map may include indications of the one or more constructs and indications of the priority assigned to each construct of the one or more constructs. The map be be displayed via a user interface, client device, user device, and/or the like. The map may include one or more interactive elements that, when interacted with, cause display of images/video and/or data/information associated with one or more constructs.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a computing device from one or more first devices, first construct data, wherein the first construct data comprises a plurality of identifiers for a plurality of constructs and first location data for the plurality of constructs;
receiving, by the computing device from one or more second devices, second construct data comprising one or more images of each construct of the plurality of constructs, wherein the one or more images are captured by one or more sensors of the one or more second devices;
determining, based on one or more characteristics associated with each image of the one or more images, one or more coordinates associated with each image associated with each construct;
determining, for each construct of the plurality of constructs, based on the one or more coordinates associated with each image associated with each construct, a group of coordinates;
determining, based on each group of coordinates of the plurality of groups of coordinates, coordinates of a plurality of centroids;
generating, based on assigning the coordinates of each centroid of the plurality of centroids as a location for each construct, second location data comprising the assigned location for each construct;
resolving, for one or more constructs of the plurality of constructs, based on the plurality of identifiers, the first location data and the second location data;
determining, for each construct of the one or more constructs, based on the one or more images associated with the construct, status data indicating one or more adverse conditions affecting the construct;
generating, based on resolving the first location data and the second location data, a user interface comprising interactive elements that indicate the one or more constructs, the one or more images associated with the one or more constructs, and the status data; and
causing, based on the status data, one or more actions associated with the one or more constructs.

2. The method of claim 1, wherein the one or more first devices comprise one or more client devices.

3. The method of claim 1, wherein the one or more second devices comprise one or more of one or more unmanned aerial vehicles (UAV), one or more data collection devices, one or more digital pole integrity testing devices, and one or more user indications.

4. The method of claim 1, wherein each image includes metadata comprising GPS coordinates and a gimbal pitch value for each image, wherein the method further comprises:
extracting the GPS coordinates and the gimbal pitch value from the metadata of each image; and
determining, based on the GPS coordinates and the one or more gimbal pitch values associated with the one or more images, the plurality of identifiers for the plurality of constructs and the second location data for the plurality of constructs.

5. The method of claim 1, wherein resolving the first location data and the second location data for the one or more constructs comprises:
determining that the first location data for a first construct of the plurality of constructs and the second location data for a second construct of the plurality of constructs satisfy a distance threshold;
determining, based on the distance threshold being satisfied, that the first construct and the second construct are the same construct; and
assigning an identifier of the plurality of identifiers for the first construct to the second location data for the second construct.

6. The method of claim 1, wherein resolving the first location data and the second location data for the one or more constructs comprises:

determining that two locations of constructs indicated by the first location data are equidistant from a location of a construct indicated by the second location data;

determining that an identifier of the plurality of identifiers for a construct associated with one location of the two locations is assigned to another location of a construct from the second location data; and assigning the identifier of the plurality of identifiers for a remaining location of the two locations to the location of the construct from the second location data.

7. The method of claim 1, wherein resolving the first location data and the second location data for the one or more constructs comprises:

determining that two locations of constructs indicated by the first location data are equidistant from a location of a construct indicated by the second location data;

determining that an identifier of the plurality of identifiers for a construct associated with one location of the two locations is assigned to another location of a construct from the second location data;

sending a notification indicating that the identifier of the plurality of identifiers for the construct associated with the one location of the two locations is assigned to the another location of the construct from the second location data; and receiving, based on the notification, an assignment of the identifier of the plurality of identifiers for a remaining location of the two locations to the location of the construct from the second location data.

8. The method of claim 1, wherein resolving the first location data and the second location data for the one or more constructs comprises:

receiving, based on two or more locations of constructs indicated by the first location data and respective distance relationships with a location of a construct indicated by the second location data, an indication that an identifier of the plurality of identifiers for a construct associated with a location of the two or more locations is assigned to another location of a construct from the second location data; and receiving an assignment of an identifier of the plurality of identifiers for a remaining location of the two or more locations to the location of the construct from the second location data.

9. The method of claim 1, further comprising:

sending, based on the status data for at least one construct of the one or more constructs, a request to one or more of a third-party service device and a work management system, wherein one or more of the third-party service device and the work management system is configured to facilitate, based on the one or more adverse conditions affecting the at least one construct, one or more of a repair to the at least one construct, a modification to the at least one construct, and an update to the at least one construct.

10. The method of claim 1, wherein the one or more actions associated with the one or more constructs comprise one or more of repairing the one or more constructs, modifying the one or more constructs, or updating the one or more constructs.

11. One or more non-transitory computer-readable media storing processor-executable instructions that, when executed by at least one processor, cause the at least one processor to:

receive, by a computing device from one or more first devices, first construct data, wherein the first construct data comprises a plurality of identifiers for a plurality of constructs and first location data for the plurality of constructs;

receive, by the computing device from one or more second devices, second construct data comprising one or more images of each construct of the plurality of constructs, wherein the one or more images are captured by one or more sensors of the one or more second devices;

determine, based on one or more characteristics associated with each image of the one or more images, one or more coordinates associated with each image associated with each construct;

determine, for each construct of the plurality of constructs, based on the one or more coordinates associated with each image associated with each construct, a group of coordinates;

determine, based on each group of coordinates of the plurality of groups of coordinates, coordinates of a plurality of centroids;

generate, based on assigning the coordinates of each centroid of the plurality of centroids as a location for each construct, second location data comprising the assigned location for each construct;

resolve, for one or more constructs of the plurality of constructs, based on the plurality of identifiers, the first location data and the second location data;

determine, for each construct of the one or more constructs, based on the one or more images associated with the construct, status data indicating one or more adverse conditions affecting the construct;

generate, based on resolving the first location data and the second location data, a user interface comprising interactive elements that indicate the one or more constructs, the one or more images associated with the one or more constructs, and the status data; and cause, based on the status data, one or more actions associated with the one or more constructs.

12. The non-transitory computer-readable media of claim 11, wherein the one or more first devices comprise one or more client devices, and wherein the one or more second devices comprise one or more of one or more unmanned aerial vehicles (UAV), one or more data collection devices, one or more digital pole integrity testing devices, and one or more user indications.

13. The non-transitory computer-readable media of claim 11, wherein the processor-executable instructions that, when executed by the at least one processor, cause the at least one processor to resolve the first location data and the second location data for the one or more constructs, further cause the at least one processor to:

determine that the first location data for a first construct of the plurality of constructs and the second location data for a second construct of the plurality of constructs satisfy a distance threshold;

determine, based on the distance threshold being satisfied, that the first construct and the second construct are the same construct; and assign an identifier of the plurality of identifiers for the first construct to the second location data for the second construct.

14. The non-transitory computer-readable media of claim 11, wherein the processor-executable instructions that, when executed by the at least one processor, cause the at least one processor to resolve the first location data and the second location data for the one or more constructs, further cause the at least one processor to:

determine that two locations of constructs indicated by the first location data are equidistant from a location of a construct indicated by the second location data;

determine that an identifier of the plurality of identifiers for a construct associated with one location of the two locations is assigned to another location of a construct from the second location data; and assign the identifier of the plurality of identifiers for a remaining location of the two locations to the location of the construct from the second location data.

15. The non-transitory computer-readable media of claim 11, wherein the processor-executable instructions that, when executed by the at least one processor, cause the at least one processor to resolve the first location data and the second location data for the one or more constructs, further cause the at least one processor to:

determine that two locations of constructs indicated by the first location data are equidistant from a location of a construct indicated by the second location data;

determine that an identifier of the plurality of identifiers for a construct associated with one location of the two locations is assigned to another location of a construct from the second location data;

send a notification indicating that the identifier of the plurality of identifiers for the construct associated with the one location of the two locations is assigned to the another location of the construct from the second location data; and receive, based on the notification, an assignment of the identifier of the plurality of identifiers for a remaining location of the two locations to the location of the construct from the second location data.

16. The non-transitory computer-readable media of claim 11, wherein the processor-executable instructions that, when executed by the at least one processor, cause the at least one processor to resolve the first location data and the second location data for the one or more constructs, further cause the at least one processor to:

receive, based on two or more locations of constructs indicated by the first location data and respective distance relationships with a location of a construct indicated by the second location data, an indication that an identifier of the plurality of identifiers for a construct associated with a location of the two or more locations is assigned to another location of a construct from the second location data; and receive an assignment of an identifier of the plurality of identifiers for a remaining location of the two or more locations to the location of the construct from the second location data.

17. The non-transitory computer-readable media of claim 11, wherein the one or more actions associated with the one or more constructs comprise one or more of repairing the one or more constructs, modifying the one or more constructs, or updating the one or more constructs.

18. A system comprising:

one or more first devices configured to send first construct data, wherein the first construct data comprises a plurality of identifiers for a plurality of constructs and first location data for the plurality of constructs;

one or more second devices configured to send second construct data, the second construct data comprises one or more images of each construct of the plurality of constructs, wherein the one or more images are captured by one or more sensors of the one or more second devices; and a computing device configured to:

receive the first construct data and the second construct data, determine, based on one or more characteristics associated with each image of the one or more images, one or more coordinates associated with each image associated with each construct, determine, for each construct of the plurality of constructs, based on the one or more coordinates associated with each image associated with each construct, a group of coordinates, determine, based on each group of coordinates of the plurality of groups of coordinates, coordinates of a plurality of centroids, generate, based on assigning the coordinates of each centroid of the plurality of centroids as a location for each construct, second location data comprising the assigned location for each construct, resolve, for one or more constructs of the plurality of constructs, based on the plurality of identifiers, the first location data and the second location data, determine, for each construct of the one or more constructs, based on the one or more images associated with the construct, status data indicating one or more adverse conditions affecting the construct, generate, based on resolving the first location data and the second location data, a user interface comprising interactive elements that indicate the one or more constructs, the one or more images associated with the one or more constructs, and the status data, and cause, based on the status data, one or more actions associated with the one or more constructs.

19. The system of claim 18, wherein the one or more first devices comprise one or more client devices, and wherein the one or more second devices comprise one or more of one or more unmanned aerial vehicles (UAV), one or more data collection devices, one or more digital pole integrity testing devices, and one or more user indications.

20. The system of claim 18, wherein the computing device is configured to resolve the first location data and the second location data for the one or more constructs, the computing device is further configured to:

determine that the first location data for a first construct of the plurality of constructs and the second location data for a second construct of the plurality of constructs satisfy a distance threshold;

determine, based on the distance threshold being satisfied, that the first construct and the second construct are the same construct; and assign an identifier of the plurality of identifiers for the first construct to the second location data for the second construct.

21. The system of claim 18, wherein the computing device is configured to resolve the first location data and the second location data for the one or more constructs, the computing device is further configured to:

determine that two locations of constructs indicated by the first location data are equidistant from a location of a construct indicated by the second location data;

determine that an identifier of the plurality of identifiers for a construct associated with one location of the two locations is assigned to another location of a construct from the second location data; and assign the identifier of the plurality of identifiers for a remaining location of the two locations to the location of the construct from the second location data.

22. The system of claim 18, wherein the computing device is configured to resolve the first location data and the second location data for the one or more constructs, the computing device is further configured to:

determine that two locations of constructs indicated by the first location data are equidistant from a location of a construct indicated by the second location data;

determine that an identifier of the plurality of identifiers for a construct associated with one location of the two locations is assigned to another location of a construct from the second location data;

send a notification indicating that the identifier of the plurality of identifiers for the construct associated with the one location of the two locations is assigned to the another location of the construct from the second location data; and receive, based on the notification, an assignment of the identifier of the plurality of identifiers for a remaining location of the two locations to the location of the construct from the second location data.

23. The system of claim 18, wherein the computing device is configured to resolve the first location data and the second location data for the one or more constructs, the computing device is further configured to:

receive, based on two or more locations of constructs indicated by the first location data and respective distance relationships with a location of a construct indicated by the second location data, an indication that an identifier of the plurality of identifiers for a construct associated with a location of the two or more locations is assigned to another location of a construct from the second location data; and receive an assignment of an identifier of the plurality of identifiers for a remaining location of the two or more locations to the location of the construct from the second location data.

24. The system of claim 18, wherein the one or more actions associated with the one or more constructs comprise one or more of repairing the one or more constructs, modifying the one or more constructs, or updating the one or more constructs.

* * * * *